US012641457B2

(12) United States Patent
Yang

(10) Patent No.: US 12,641,457 B2
(45) Date of Patent: May 26, 2026

(54) METHOD AND DEVICE FOR ACQUIRING MEASUREMENT INFORMATION FOR TERMINAL

(71) Applicant: Beijing Xiaomi Mobile Software Co., Ltd., Beijing (CN)

(72) Inventor: Xing Yang, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 545 days.

(21) Appl. No.: 18/250,145

(22) PCT Filed: Oct. 22, 2020

(86) PCT No.: PCT/CN2020/123001
§ 371 (c)(1),
(2) Date: Apr. 21, 2023

(87) PCT Pub. No.: WO2022/082673
PCT Pub. Date: Apr. 28, 2022

(65) Prior Publication Data
US 2023/0413082 A1　　Dec. 21, 2023

(51) Int. Cl.
*H04W 24/08*　　(2009.01)
*H04W 64/00*　　(2009.01)
(52) U.S. Cl.
CPC ......... *H04W 24/08* (2013.01); *H04W 64/006* (2013.01)
(58) Field of Classification Search
CPC ... H04W 24/08; H04W 64/006; H04W 24/10; H04W 64/00; H04W 4/023; H04W 4/027; H04W 24/02; Y02D 30/70
See application file for complete search history.

(56) References Cited

U.S. PATENT DOCUMENTS

| | | | | | |
|---|---|---|---|---|---|
| 6,950,663 | B2 * | 9/2005 | Pihl | ...................... | H04W 64/00 |
| | | | | | 342/450 |
| 8,699,990 | B2 * | 4/2014 | Bussan | ................. | H04W 64/00 |
| | | | | | 455/404.2 |
| 8,744,487 | B2 * | 6/2014 | Jovicic | .................. | G01S 5/0081 |
| | | | | | 455/456.2 |
| 8,948,093 | B2 * | 2/2015 | Xu | ...................... | H04B 7/0689 |
| | | | | | 370/480 |

(Continued)

FOREIGN PATENT DOCUMENTS

| | | | | | |
|---|---|---|---|---|---|
| AU | | 2020420706 A1 * | 6/2022 | ............ | H04W 64/00 |
| AU | | 2020420706 B2 * | 6/2023 | ............ | H04W 24/10 |

(Continued)

OTHER PUBLICATIONS

International Search Report Issued Jul. 21, 2021, in PCT/CN2020/123001, filed on Oct. 22, 2020, 2 pages.

(Continued)

*Primary Examiner* — Michael A Keller
(74) *Attorney, Agent, or Firm* — Oblon, McClelland, Maier & Neustadt, L.L.P.

(57) ABSTRACT

A method for a terminal to acquire measurement information is provided. The method is applied to the terminal, the method includes receiving configuration information for the terminal to acquire measurement information, and the configuration information is used for determining an acquisition period of the measurement information according to movement information of the terminal.

20 Claims, 8 Drawing Sheets

(56) References Cited

U.S. PATENT DOCUMENTS

| | | | | |
|---|---|---|---|---|
| 9,036,608 | B2 * | 5/2015 | Chen | H04W 24/10 |
| | | | | 370/310.2 |
| 9,088,323 | B2 * | 7/2015 | Park | H04W 88/02 |
| 9,203,489 | B2 * | 12/2015 | Sayana | H04B 7/0456 |
| 9,220,028 | B2 * | 12/2015 | Suzuki | H04W 24/10 |
| 10,098,063 | B2 * | 10/2018 | Chuang | H04W 76/28 |
| 10,863,433 | B2 * | 12/2020 | Li | H04W 76/27 |
| 11,009,582 | B2 * | 5/2021 | Hu | G01S 5/06 |
| 11,194,013 | B2 * | 12/2021 | Jiang | H04W 4/44 |
| 11,470,494 | B2 * | 10/2022 | Fukuta | H04W 24/10 |
| 11,516,809 | B2 * | 11/2022 | Xu | H04W 48/16 |
| 11,546,926 | B2 * | 1/2023 | Choi | G01S 13/765 |
| 11,785,622 | B2 * | 10/2023 | Xu | H04W 16/28 |
| | | | | 370/329 |
| 12,120,630 | B2 * | 10/2024 | Liu | H04W 24/10 |
| 2003/0040323 | A1 * | 2/2003 | Pihl | H04W 64/00 |
| | | | | 342/357.31 |
| 2004/0180645 | A1 * | 9/2004 | Bussan | H04W 64/00 |
| | | | | 455/456.1 |
| 2009/0160711 | A1 * | 6/2009 | Mehta | G01S 5/0205 |
| | | | | 342/450 |
| 2011/0201279 | A1 | 8/2011 | Suzuki et al. | |
| 2011/0276259 | A1 * | 11/2011 | Nortrup | G08G 1/0967 |
| | | | | 701/119 |
| 2012/0082051 | A1 * | 4/2012 | Kim | H04W 24/10 |
| | | | | 370/252 |
| 2012/0184301 | A1 * | 7/2012 | Jovicic | G01S 5/0226 |
| | | | | 455/422.1 |
| 2013/0084888 | A1 * | 4/2013 | Johansson | H04W 24/08 |
| | | | | 455/456.1 |
| 2013/0130628 | A1 * | 5/2013 | Takano | H04W 24/02 |
| | | | | 455/67.11 |
| 2013/0237245 | A1 * | 9/2013 | Tinnakornsrisuphap | |
| | | | | H04W 24/02 |
| | | | | 455/456.1 |
| 2014/0192918 | A1 * | 7/2014 | Park | H04B 7/0487 |
| | | | | 375/267 |
| 2015/0358890 | A1 | 12/2015 | Xu et al. | |
| 2016/0100393 | A1 * | 4/2016 | Takashima | H04W 72/51 |
| | | | | 370/329 |
| 2016/0360438 | A1 * | 12/2016 | Yiu | H04W 64/00 |
| 2017/0180937 | A1 * | 6/2017 | Vaccari | G06Q 50/01 |
| 2017/0318527 | A1 * | 11/2017 | Chuang | H04W 72/51 |
| 2018/0139622 | A1 * | 5/2018 | Cornforth | H04W 16/18 |
| 2018/0227874 | A1 * | 8/2018 | Sirotkin | H04W 64/00 |
| 2018/0324815 | A1 * | 11/2018 | Nammi | H04B 7/0482 |
| 2019/0037634 | A1 * | 1/2019 | Kadiri | H04W 24/10 |
| 2019/0253964 | A1 * | 8/2019 | Li | H04L 5/0048 |
| 2020/0228916 | A1 * | 7/2020 | Smith | G01S 5/0284 |
| 2020/0374736 | A1 * | 11/2020 | Fukuta | H04W 24/08 |
| 2021/0160720 | A1 * | 5/2021 | Chiang | H04W 24/10 |
| 2021/0286041 | A1 * | 9/2021 | Jiang | G01S 5/10 |
| 2021/0314838 | A1 * | 10/2021 | Sheng | H04W 48/16 |
| 2021/0329416 | A1 * | 10/2021 | Li | H04W 4/02 |
| 2021/0345316 | A1 * | 11/2021 | Xu | H04W 48/16 |
| 2022/0070883 | A1 * | 3/2022 | Choi | H04B 7/06952 |
| 2023/0039686 | A1 * | 2/2023 | Xu | H04W 48/16 |
| 2023/0064287 | A1 * | 3/2023 | Liu | H04W 64/003 |
| 2024/0121753 | A1 * | 4/2024 | Bao | G01S 1/04 |
| 2025/0048326 | A1 * | 2/2025 | Lee | H04W 64/003 |
| 2025/0105974 | A1 * | 3/2025 | Saha | H04W 64/00 |
| 2025/0119862 | A1 * | 4/2025 | Zorgui | H04L 27/2657 |
| 2025/0132843 | A1 * | 4/2025 | Hirzallah | H04B 17/11 |
| 2025/0138198 | A1 * | 5/2025 | Chi | G01S 19/05 |
| 2025/0155543 | A1 * | 5/2025 | Huang | G01S 5/0284 |
| 2025/0159648 | A1 * | 5/2025 | Zhao | H04W 64/00 |
| 2025/0220620 | A1 * | 7/2025 | Wang | H04W 24/02 |
| 2025/0277885 | A1 * | 9/2025 | Duan | G01S 5/0236 |
| 2026/0031918 | A1 * | 1/2026 | Huh | H04B 17/318 |

FOREIGN PATENT DOCUMENTS

| | | | | |
|---|---|---|---|---|
| CN | 1871844 | A * | 11/2006 | H04W 64/00 |
| CN | 101129083 | A | 2/2008 | |
| CN | 101547465 | A | 9/2009 | |
| CN | 101610521 | A | 12/2009 | |
| CN | 102098703 | A | 6/2011 | |
| CN | 108401507 | A * | 8/2018 | H04W 24/10 |
| CN | 110149693 | A | 8/2019 | |
| CN | 110839254 | A | 2/2020 | |
| CN | 110149693 | B * | 9/2020 | H04B 7/1853 |
| CN | 111901827 | A * | 11/2020 | H04W 64/003 |
| CN | 112514419 | A * | 3/2021 | H04W 24/02 |
| CN | 110839254 | B * | 12/2021 | H04W 24/08 |
| CN | 115004776 | A * | 9/2022 | H04W 36/0058 |
| CN | 115150882 | A * | 10/2022 | H04W 4/80 |
| CN | 115280185 | A * | 11/2022 | H04W 64/006 |
| CN | 116017688 | A * | 4/2023 | H04B 17/328 |
| CN | 116391402 | A * | 7/2023 | H04W 64/00 |
| CN | 116457683 | A * | 7/2023 | G01S 5/0081 |
| CN | 117461331 | A * | 1/2024 | G01S 5/0036 |
| CN | 118251606 | A * | 6/2024 | H04W 64/00 |
| CN | 115190470 | B * | 8/2024 | H04L 25/0202 |
| CN | 113170322 | B * | 9/2024 | H04W 72/046 |
| CN | 118805097 | A * | 10/2024 | H04W 64/00 |
| CN | 119654940 | A * | 3/2025 | H04W 64/00 |
| EP | 1289331 | A2 * | 3/2003 | G01S 5/10 |
| EP | 2527858 | A1 * | 11/2012 | H04W 64/00 |
| EP | 2542002 | A2 * | 1/2013 | H04B 7/2606 |
| EP | 2661125 | A1 * | 11/2013 | H04W 36/324 |
| EP | 3030000 | A1 * | 6/2016 | H04W 52/0216 |
| EP | 3322207 | A1 * | 5/2018 | H04W 16/18 |
| EP | 3852397 | A1 * | 7/2021 | H04W 24/08 |
| EP | 4090069 | A1 * | 11/2022 | H04W 24/10 |
| EP | 4529277 | A1 * | 3/2025 | H04W 36/08 |
| EP | 4542263 | A1 * | 4/2025 | H04W 64/006 |
| EP | 4561203 | A1 * | 5/2025 | H04W 64/00 |
| EP | 4204837 | B1 * | 7/2025 | H04B 7/06952 |
| EP | 4645974 | A1 * | 11/2025 | H04W 56/0015 |
| EP | 4651554 | A2 * | 11/2025 | H04W 76/18 |
| JP | 2025510326 | A * | 4/2025 | H04W 24/02 |
| KR | 20050110664 | A * | 11/2005 | G01S 19/46 |
| KR | 20160073730 | A * | 6/2016 | H04W 64/003 |
| KR | 101653578 | B1 * | 9/2016 | H04W 64/00 |
| KR | 101779966 | B1 * | 10/2017 | G01C 21/367 |
| KR | 20170129893 | A * | 11/2017 | H04W 64/00 |
| KR | 10-2020-0086623 | A | 7/2020 | |
| KR | 102519152 | B1 * | 4/2023 | G01S 5/04 |
| KR | 102604366 | B1 * | 11/2023 | H04W 64/00 |
| KR | 20230157957 | A * | 11/2023 | G01S 5/10 |
| KR | 20240158882 | A * | 11/2024 | H04W 64/00 |
| RU | 2013109305 | A * | 9/2014 | G01S 5/02527 |
| RU | 2850057 | C2 * | 11/2025 | |
| WO | WO-2004082191 | A2 * | 9/2004 | G01S 19/46 |
| WO | WO 2010/143833 | A2 | 12/2010 | |
| WO | WO-2011097728 | A1 * | 8/2011 | H04W 24/10 |
| WO | WO-2011148821 | A1 * | 12/2011 | H04W 24/10 |
| WO | WO-2011150262 | A1 * | 12/2011 | H04W 24/08 |
| WO | WO-2012032724 | A1 * | 3/2012 | G01S 5/0242 |
| WO | WO 2013/104176 | A1 | 7/2013 | |
| WO | WO-2013134724 | A1 * | 9/2013 | H04W 24/02 |
| WO | WO-2014027947 | A2 * | 2/2014 | H04B 7/0413 |
| WO | WO-2014114164 | A1 * | 7/2014 | H04W 64/00 |
| WO | WO-2015016530 | A1 * | 2/2015 | H04W 48/12 |
| WO | WO-2015168859 | A1 * | 11/2015 | H04W 24/10 |
| WO | WO-2016188163 | A1 * | 12/2016 | H04W 64/00 |
| WO | WO-2017016605 | A1 * | 2/2017 | H04W 24/02 |
| WO | WO-2017018967 | A1 * | 2/2017 | G01S 5/00 |
| WO | WO-2018028424 | A1 * | 2/2018 | G01S 5/14 |
| WO | WO-2019106419 | A1 * | 6/2019 | G01S 5/02522 |
| WO | WO-2019134555 | A1 * | 7/2019 | H04W 64/006 |
| WO | WO-2019140679 | A1 * | 7/2019 | H04W 24/10 |
| WO | WO-2019160083 | A1 * | 8/2019 | H04W 24/10 |
| WO | WO-2020034867 | A1 * | 2/2020 | H04W 52/0212 |
| WO | WO-2020042081 | A1 * | 3/2020 | H04W 64/00 |
| WO | WO-2020052599 | A1 * | 3/2020 | H04W 24/08 |
| WO | WO-2020093929 | A1 * | 5/2020 | H04W 72/51 |
| WO | WO-2020145559 | A1 * | 7/2020 | H04W 48/16 |
| WO | WO-2021031714 | A1 * | 2/2021 | G01S 5/08 |

(56)     References Cited

FOREIGN PATENT DOCUMENTS

| WO | WO-2021139398 | A1 | * | 7/2021 | ............ | H04W 24/10 |
| WO | WO-2022047146 | A1 | * | 3/2022 | .......... | H04W 72/542 |
| WO | WO-2022087907 | A1 | * | 5/2022 | ............ | H04W 64/00 |
| WO | WO-2022101238 | A2 | * | 5/2022 | ............ | H04W 4/025 |
| WO | WO-2022192887 | A2 | * | 9/2022 | .............. | G01S 5/10 |
| WO | WO-2022262293 | A1 | * | 12/2022 | .......... | G01S 5/0036 |
| WO | WO-2023035275 | A1 | * | 3/2023 | .......... | G01S 19/256 |
| WO | WO-2023080682 | A1 | * | 5/2023 | ............ | H04B 17/328 |
| WO | WO-2023091842 | A1 | * | 5/2023 | ............ | H04W 64/00 |
| WO | WO-2023172816 | A1 | * | 9/2023 | ............ | H04W 64/00 |
| WO | WO-2023184112 | A1 | * | 10/2023 | ............ | H04W 24/02 |
| WO | WO-2024019463 | A1 | * | 1/2024 | ............ | H04W 64/00 |
| WO | WO-2024138889 | A1 | * | 7/2024 | ............ | H04B 17/328 |
| WO | WO-2024155003 | A1 | * | 7/2024 | ............ | H04W 84/06 |
| WO | WO-2025075777 | A1 | * | 4/2025 | ............. | H04W 8/22 |
| WO | WO-2025085159 | A1 | * | 4/2025 | ............ | H04B 17/11 |

OTHER PUBLICATIONS

Chinese Office Action issued Nov. 18, 2022 in Chinese Patent Application No. 202080002888.6, 7 pages.

Combined Chinese Office Action and Search Report issued Jun. 5, 2023 in Chinese Application 202080002888.6, 9 pages.

* cited by examiner

1

METHOD AND DEVICE FOR ACQUIRING MEASUREMENT INFORMATION FOR TERMINAL

CROSS-REFERENCE TO RELATED APPLICATIONS

The present application is a U.S. National Stage of International Application No. PCT/CN2020/123001 filed on Oct. 22, 2020, the entire contents of which are incorporated herein by reference for all purposes.

TECHNICAL FIELD

The present disclosure relates to the technology field of wireless communication but is not limited thereto, and in particular, to a method and device for acquiring measurement information by a terminal, a communication device and a storage medium.

BACKGROUND

In a non-terrestrial network (NTN), a base station antenna may be disposed on a high altitude platform station or a satellite, which is located at altitudes ranging from tens to tens of thousands of kilometres above the ground or in space. Each NTN cell may cover a large area. Depending on the height of a transmitting antenna, the coverage thereof may be from tens to hundreds of kilometres in diameter. The NTN is mainly used to cover areas where there is no terrestrial network, such as oceans, deserts and the like.

SUMMARY

Embodiments of the present disclosure disclose a method and device for acquiring measurement information by a terminal, a communication device and a storage medium.

A first aspect of the present disclosure provides a method for acquiring measurement information by a terminal, applied to the terminal and including receiving configuration information for the terminal to acquire the measurement information, wherein the configuration information is configured to determine, according to movement information of the terminal, an acquisition period of the measurement information.

In an embodiment, the acquisition period includes:

an acquisition period of geographic location information of the terminal; and/or an acquisition period for the terminal to acquire a channel measurement result.

In an embodiment, the configuration information includes:

a first period configuration including an initial value of the acquisition period; and a first period scaling configuration including a reference distance and a scaling factor, wherein the scaling factor corresponds to the reference distance and is configured to scale the initial value.

In an embodiment, the movement information includes a measured distance, and the method further includes:

determining the measured distance according to a magnitude relationship between an acquisition period in a previous acquisition of the measurement information and the initial value; and

determining, according to the measured distance and the first period scaling configuration, an acquisition period corresponding to the measured distance.

In an embodiment, determining the measured distance according to the magnitude relationship between the acquisition period in the previous acquisition of the measurement information and the initial value, includes:

determining, in response to the acquisition period in the previous acquisition of the measurement information being the same as the initial value, that the measured distance is a movement distance, wherein the movement distance is a movement distance of a current location of the terminal relative to a location of the terminal at the time of the previous acquisition of the measurement information, or a movement distance of the current location of the terminal relative to a location of a reference point in a cell in which the terminal is located; or determining, in response to the acquisition period in the previous acquisition of the measurement information being different from the initial value, that the measured distance is a distance obtained by scaling the movement distance according to a distance scaling parameter, wherein the distance scaling parameter is a ratio of the acquisition period of the terminal at the time of the previous acquisition of the measurement information to the initial value.

In an embodiment, the configuration information includes:

a first period configuration including an initial value of the acquisition period; and a second period scaling configuration including a speed level and a scaling factor, wherein the scaling factor corresponds to the speed level and is configured to scale the initial value.

In an embodiment, the movement information includes a movement speed of the terminal, and the method further includes:

determining, according to a movement level corresponding to the movement speed of the terminal and the second period scaling configuration, an acquisition period corresponding to the movement speed of the terminal.

In an embodiment, the method further includes:

determining the movement speed of the terminal according to a movement distance and an acquisition period corresponding to a previous acquisition of the measurement information, wherein the movement distance is a movement distance of a current location of the terminal relative to a location of the terminal at the time of the previous acquisition of the measurement information.

In an embodiment, the configuration information further includes a movement speed configuration, and the method further includes:

determining, according to the movement speed and the movement speed configuration, a movement level corresponding to the movement speed of the terminal, wherein the movement speed configuration includes the movement speed and the speed level corresponding to the movement speed.

In an embodiment, the configuration information includes:

a first period configuration including an initial value of the acquisition period; and a third period scaling configuration including a signal strength and a scaling factor, wherein the scaling factor corresponds to the signal strength and is configured to scale the initial value.

In an embodiment, the movement information includes a signal strength of a reference signal received when the terminal moves, and the method further includes:

determining, according to the signal strength of the reference signal received and the third period scaling configuration, an acquisition period corresponding to the signal strength received.

In an embodiment, the configuration information includes:

configuration information sent by a base station via a broadcast message; and/or configuration information sent by the base station via a radio resource control (RRC) message.

In an embodiment, the method further includes:

after receiving the configuration information sent by the base station via the RRC message, ignoring the configuration information sent by the base station via the broadcast message.

A second aspect of the present disclosure provides a method for acquiring measurement information by a terminal, applied to a base station and including:

sending configuration information for the terminal to acquire the measurement information, wherein the configuration information is configured to determine, according to movement information of the terminal, an acquisition period of the measurement information.

In an embodiment, the acquisition period includes:

an acquisition period of geographic location information of the terminal; and/or an acquisition period for the terminal to acquire a channel measurement result.

In an embodiment, the configuration information includes:

a first period configuration including an initial value of the acquisition period; and a first period scaling configuration including a reference distance and a scaling factor, wherein the scaling factor corresponds to the reference distance and is configured to scale the initial value.

In an embodiment, the configuration information includes:

a first period configuration including an initial value of the acquisition period; and a second period scaling configuration including a speed level and a scaling factor, wherein the scaling factor corresponds to the speed level and is configured to scale the initial value.

In an embodiment, the configuration information includes:

a first period configuration including an initial value of the acquisition period; and a third period scaling configuration including a signal strength and a scaling factor, wherein the scaling factor corresponds to the signal strength and is configured to scale the initial value.

In an embodiment, the configuration information includes:

broadcasting the configuration information; and/or sending a radio resource control (RRC) message carrying the configuration information.

A third aspect of the present disclosure provides a device for acquiring measurement information by a terminal, applied to the terminal and including a receiving module, wherein the receiving module is configured to receive configuration information for the terminal to acquire the measurement information, wherein the configuration information is configured to determine, according to movement information of the terminal, an acquisition period of the measurement information.

A fourth aspect of the present disclosure provides a device for acquiring measurement information by a terminal, applied to a base station and including a sending module, wherein the sending module is configured to send configuration information for the terminal to acquire the measurement information, wherein the configuration information is configured to determine, according to movement information of the terminal, an acquisition period of the measurement information.

A fifth aspect of the present disclosure provides a communication device, including:

a processor; and a memory for storing executable instructions of the processor, wherein the processor is configured to implement the method according to any embodiment of the present disclosure when running the executable instructions.

A sixth aspect of the present disclosure provides a computer storage medium storing executable instructions of a computer that, when being executed by a processor, implement the method according to any embodiment of the present disclosure.

DETAILED DESCRIPTION

Exemplary embodiments will be described in detail herein, examples of which are illustrated in the accompanying drawings. When the following description is made with reference to the drawings, the same numerals in different drawings refer to the same or similar elements unless otherwise indicated. The implementations described in the embodiments below are not intended to represent all implementations of the embodiments of the present disclosure. Rather, they are merely examples of devices and methods according to some aspects of the embodiments of the present disclosure as recited in the appended claims.

The terms used in embodiments of the present disclosure are used solely for the purpose of describing particular embodiments and are not intended to limit embodiments of the present disclosure. The singular forms of "a" and "the" as used in the embodiments of the present disclosure and the appended claims are also intended to include the plural forms, unless the context clearly indicates otherwise. It should also be understood that the term "and/or" as used herein refers to and includes any or all possible combinations of one or more of the associated listed items.

It should be understood that although the terms first, second, third, and the like may be used in embodiments of the present disclosure to describe various information, such information should not be limited by these terms. These terms are used only to distinguish information of the same type from one another. For example, without departing from the scope of embodiments of the present disclosure, first information may also be referred to as second information, and similarly, the second information may also be referred to as the first information. Depending on the context, for example, the word "if" as used herein may be interpreted as "while . . . " or "when . . . " or "in response to determining that . . . ".

For the sake of brevity and ease of understanding, the terms "greater than" or "less than" are used herein to characterize size relationships. However, it will be understood by those skilled in the art that the term "greater than" also covers the meaning of "greater than or equal to" and the term "less than" also covers the meaning of "less than or equal to".

Figure 1:
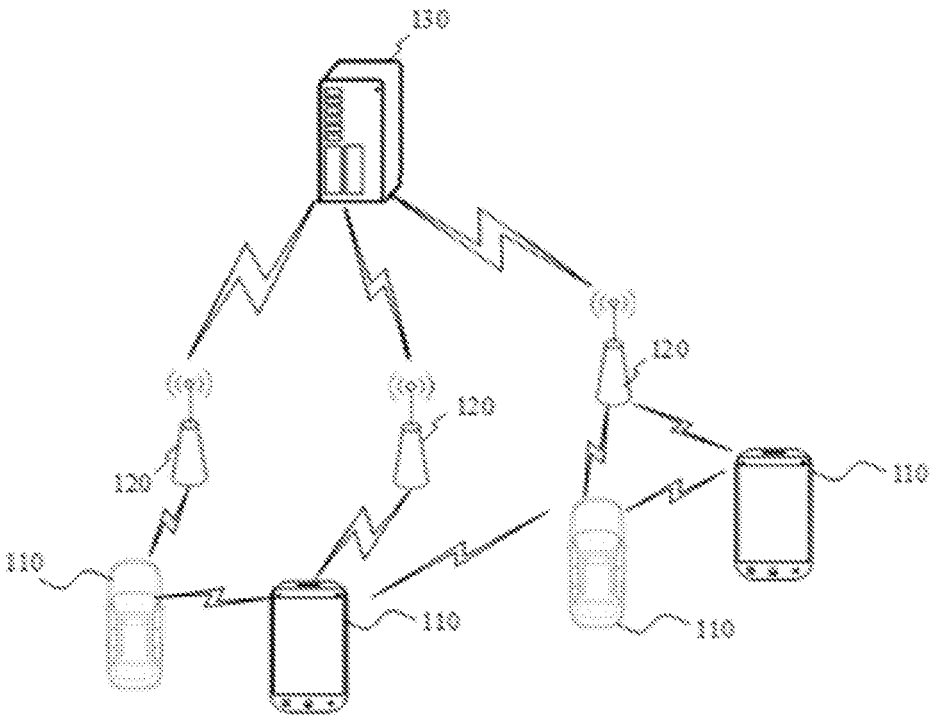
FIG. 1 is a schematic diagram of a structure of a wireless communication system.

FIG. 1 illustrates a schematic structure diagram of a wireless communication system according to an embodiment of the present disclosure. As shown in FIG. 1, the wireless communication system is a communication system based on cellular mobile communication technology, and the wireless communication system may include a plurality of user devices 110 and a plurality of base stations 120.

The user device 110 may be a device providing voice and/or data connectivity to a user. The user device 110 may communicate with one or more core networks via a Radio Access Network (RAN). The user device 110 may be an IoT user device such as a sensor device, mobile phone (or "cellular" phone), and may be a computer with an IoT user device, for example, which may be a fixed, portable, pocket-sized, handheld, computer-built or vehicle-mounted device. For example, it may be a station (STA), subscriber unit, subscriber station, mobile station, mobile, remote station, access point, remote terminal, access terminal, user terminal, user agent, user device, or user equipment. Alternatively, the user device 110 may be an unmanned aerial vehicle device. Alternatively, the user device 110 may be a vehicle-mounted device, for example, a trip computer with a wireless communication capability, or a wireless user device externally connected to a trip computer. Alternatively, the user device 110 may be a roadside device, for example, a street light, a signal light or other roadside device with a wireless communication capability.

The base station 120 may be a network-side device in the wireless communication system. The wireless communication system may be the 4th generation mobile communication (4G) system, also known as the Long Term Evolution (LTE) system, or the wireless communication system may be the 5th generation mobile communication (5G) system, also known as the New Radio system or the 5G NR system. Alternatively, the wireless communication system may be a next generation system of the 5G system. The access network in the 5G system may be referred to as New Generation-Radio Access Network (NG-RAN).

The base station 120 may be an evolved base station (eNB) as used in the 4G system. Alternatively, the base station 120 may be a base station (gNB) with a centrally distributed architecture used in the 5G system. When the base station 120 adopts the centrally distributed architecture, it typically includes a central unit (CU) and at least two distributed units (DU). The central unit is provided with a protocol stack of Packet Data Convergence Protocol (PDCP) layer, Radio Link Control (RLC) layer and Media Access Control (MAC) layer, and the distributed unit is provided with a protocol stack of physical (PHY) layer. The specific implementation of the base station 120 is not limited in embodiments of the present disclosure.

A wireless connection may be established between the base station 120 and the user device 110 via a wireless radio. In various implementations, the wireless radio is a wireless radio based on the 4th generation mobile communication network technology (4G) standard, or the wireless radio is a wireless radio based on the 5th generation mobile communication network technology (5G) standard, for example, the wireless radio is the New Radio, or the wireless radio may also be a wireless radio based on the next generation mobile communication network technology standard of 5G.

In some embodiments, an end to end (E2E) connection may also be established between user devices 110, examples of which include vehicle to vehicle (V2V) communication, vehicle to infrastructure (V2I) communication and vehicle to pedestrian (V2P) communication in the vehicle to everything (V2X) communication scenario.

Here, the above-mentioned user devices may be considered as terminal devices in the following embodiments.

In some embodiments, the above wireless communication system may also include a network management device 130.

A number of base stations 120 are each connected to the network management device 130. The network management device 130 may be a core network device in the wireless communication system, for example, the network management device 130 may be a Mobility Management Entity (MME) in an Evolved Packet Core (EPC) network. Alternatively, the network management device may be another core network device, such as a Serving GateWay (SGW), Public Data Network GateWay (PGW), Policy and Charging Rules Function (PCRF), Home Subscriber Server (HSS), or the like. The implementation of the network management device 130 is not limited in the embodiments of the present disclosure.

For better understanding of the technical solution described in any embodiment of the present disclosure, first, a wireless communication scenario according to an embodiment is illustrated.

Figure 2:
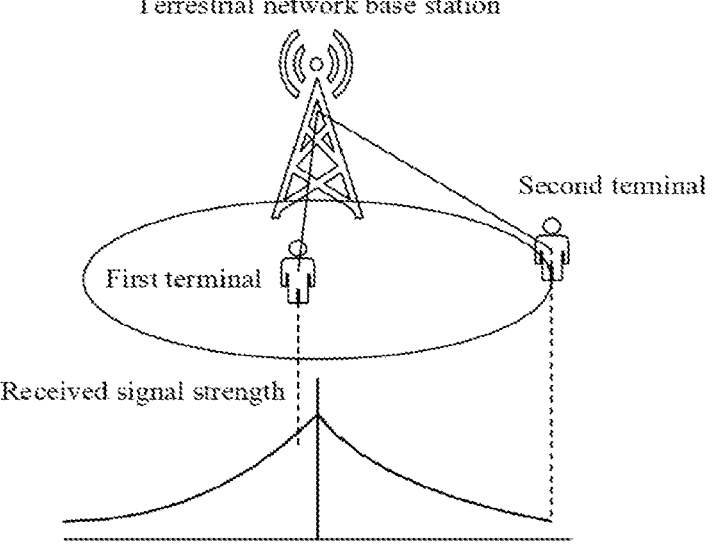
FIG. 2 is a schematic diagram of a wireless communication scenario according to an embodiment.
Figure 3:
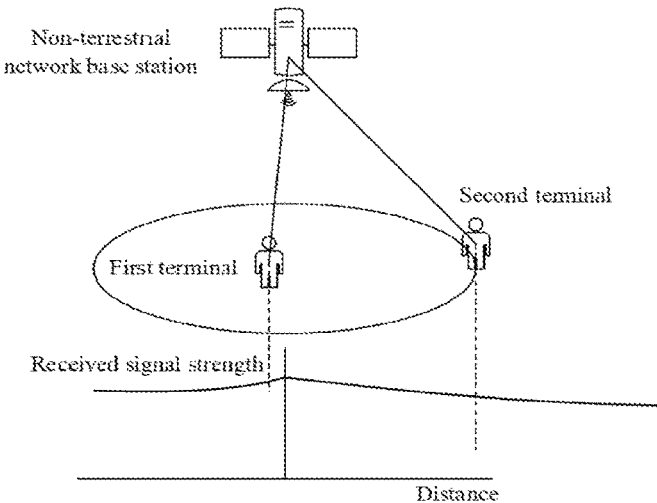
FIG. 3 is a schematic diagram of a wireless communication scenario according to an embodiment.

In the 5th generation mobile communication technology (5G) system, the non-terrestrial network (NTN) is introduced. FIGS. 2 and 3 illustrate a schematic diagram of a near-far effect of a signal strength received by a terminal in different scenarios. In particular, FIG. 2 shows the received signal strength of the terminal in a terrestrial network (TN) wireless communication scenario. The terrestrial network (TN) includes a terrestrial network base station and terminals. FIG. 3 shows the received signal strength of the terminal in the non-terrestrial network (NTN) wireless communication scenario. The non-terrestrial network (NTN) includes a non-terrestrial network base station and terminals.

In a terrestrial network, a terminal may determine whether it is in the centre of a cell or at the edge of the cell based on signal quality. In the NTN, the signal quality at the edge of the cell and the centre of the cell varies very little and it is difficult to determine whether the terminal is at the edge of the cell or the centre of the cell based on the signal quality. Therefore, the geographical location of a terminal needs to be taken into account in a mobility management process. The terminal may acquire its geographic location through the Global Positioning System (GPS). However, frequent acquisition of geographic location information may lead to high power consumption of the terminal.

In the terrestrial network (TN) system, the terminal may determine whether the terminal is at the edge of a cell edge according to the significant difference between reference signal receiving powers (RSRPs) or reference signal receiving qualities (RSRQs) at the centre and edge of the cell. However, in the non-terrestrial network (NTN), a radius of a cell is large, the difference between RSRPs or RSRQs of the terminal when the terminal is at the centre and edge of the cell is small and thus the near-far effect is not significant. In order to support mobility management, the terminal needs to periodically acquire geographic location via the Global Positioning System (GPS), which however consumes the power of the terminal. When the terminal is in the centre of the cell, the terminal will not move to another cell, and there is no need to acquire geographic information frequently, as this would lead to additional power consumption.

Figure 4:
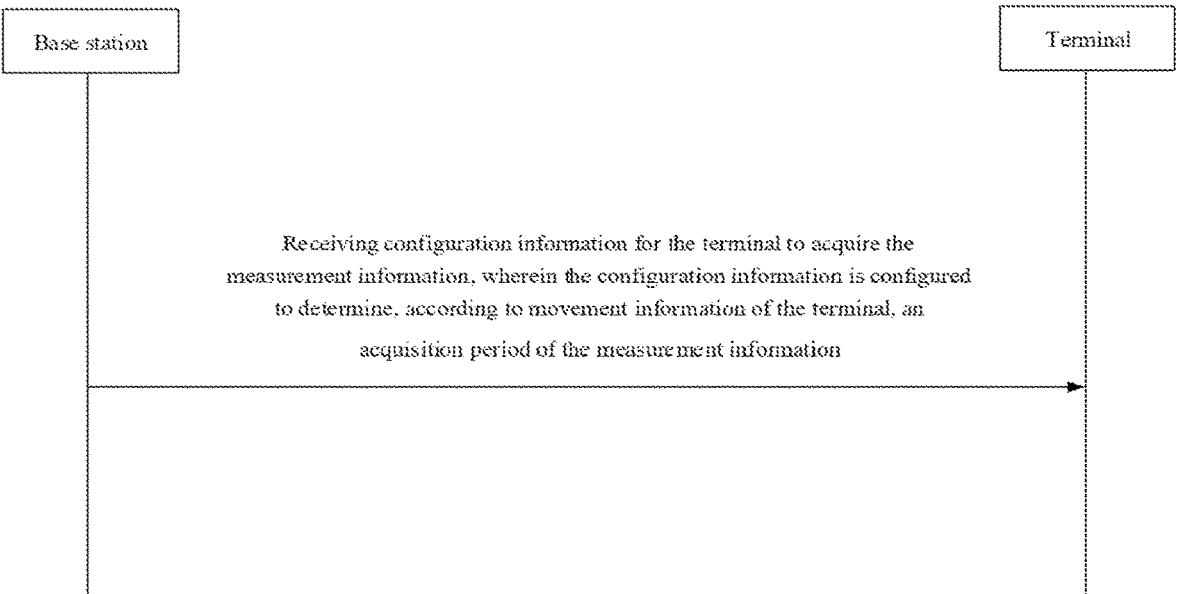
FIG. 4 is a flow diagram of a method for acquiring measurement information by a terminal according to an embodiment.

As shown in FIG. 4, an embodiment of the present disclosure provides a method of acquiring measurement information by a terminal. This method is applied to a terminal and includes:

step 41, receiving configuration information for the terminal to acquire the measurement information.

The configuration information is configured to determine, according to movement information of the terminal, an acquisition period of the measurement information.

In some embodiments, the terminal may be, but is not limited to being, a mobile phone, a wearable device, a vehicle-mounted terminal, a road side unit (RSU), a smart home terminal, an industrial sensing device and/or a medical device and the like.

In an embodiment, a base station may send the configuration information. Here, the base station is an interface device for the terminal to access the network. Here, the network may be a non-terrestrial network (NTN).

In some embodiments, the base station may be provided on a high altitude platform station or on a satellite.

In some embodiments, the base station may be a base station of various types, for example, a base station for the third generation mobile communication (3G) network, a base station for the 4th generation mobile communication (4G) network, a base station for the 5th generation mobile communication (5G) network or other evolved base stations.

In some embodiments, a cell in which the terminal is located may be a cell in the non-terrestrial network (NTN).

In an embodiment, the measurement information acquired by the terminal is location information for cell reselecting or switching.

In an embodiment, the terminal may acquire location information of the terminal via the global positioning system (GPS), determine whether the terminal is located in an edge area or a central area of a cell of the non-terrestrial network (NTN) according to the location information, and perform cell reselecting or switching by using location relationship of the terminal within the cell of the non-terrestrial network (NTN).

The edge area of the cell is located at the periphery of the central area of the cell, and typically, the edge area of the cell will be adjacent to a neighbouring cell.

In some embodiments, when the terminal is located in the central area of the cell of the non-terrestrial network (NTN) or the distance between the location of the terminal and the central area is within a distance threshold, the terminal does not need cell reselecting or switching, at which time the terminal may stop acquiring the location information of the terminal or may use an acquisition period greater than a period threshold to acquire the location information of the terminal, in order to save power consumption of the terminal.

In some embodiments, when the terminal is located in the edge area of the cell of the non-terrestrial network (NTN) or the distance between the location of the terminal and the edge area is within a distance threshold, the terminal may need to perform cell reselecting or switching, at which time the terminal needs to start acquiring the location information of the terminal or adopt an acquisition period smaller than a period threshold to acquire the location information of the terminal, so as to achieve cell reselecting or switching.

In an embodiment, the measurement information acquired by the terminal is channel measurement result information for transmitting data, and the terminal performs data transmission in the non-terrestrial network (NTN) according to the channel measurement result.

In an embodiment, a measurement object included in the channel measurement result may include at least one of a reference signal received power (RSRP), a reference signal received quality (RSRQ) and a received signal strength indicator (RSSI).

In some embodiments, when the terminal is located in the central area of the cell of the non-terrestrial network (NTN) or the distance between the location of the terminal and the central area is within a distance threshold, the data transmission quality of the terminal is good, at which time the terminal may stop acquiring a channel measurement result or use an acquisition period greater than a period threshold to acquire the channel measurement result, in order to save power consumption of the terminal.

In some embodiments, when the terminal is located in the edge area of the cell of the non-terrestrial network (NTN) or the distance between the location of the terminal and the edge area is within the distance threshold, the data transmission quality of the terminal is poor, at which time the terminal needs to start acquiring the channel measurement result or adopt an acquisition period smaller than the period threshold to acquire the channel measurement result, in order to achieve stable data transmission.

In some embodiments, the measurement information may include information about the location of the terminal and/or information about the channel measurement result.

In an embodiment, the terminal may acquire the measurement information from the base station.

In another embodiment, the terminal may acquire the measurement information from an application layer of the terminal.

In an embodiment, when the acquisition period is determined, the terminal sends a request for geographic location information to the application layer of the terminal according to the acquisition period to acquire geographic location information from the application layer of the terminal.

In an embodiment, the terminal may periodically acquire the measurement information. Here, the acquisition period may be a period in which the terminal periodically acquires the measurement information.

In an embodiment, the application layer of the terminal may acquire the measurement information of the terminal, and a protocol layer under the application layer of the terminal acquires the measurement information periodically from the application layer of the terminal.

In an embodiment, the terminal may receive, from the base station, the configuration information for the terminal to acquire the measurement information when the terminal establishes a radio resource control (RRC) connection with the base station.

In an embodiment, when the terminal needs to acquire the measurement information, the terminal sends an acquisition request for the measurement information to the base station, and the base station, upon receiving the acquisition request from the terminal, sends the configuration information for the terminal to acquire the measurement information to the terminal.

In an embodiment, in response to the terminal being activated, the acquisition request for the measurement information is sent to the base station, and the base station, after receiving the acquisition request from the terminal, sends the configuration information for the terminal to acquire the measurement information to the terminal.

In an embodiment, the movement information may be information of the movement of the terminal, for example, a movement speed of the terminal and a movement distance of the terminal. It shall be noted that the movement information may also be information associated with the movement of the terminal, for example, reference signal received power (RSRP) and reference signal received quality (RSRQ) corresponding to a reference signal sent by the base station to the terminal, and the like.

In an embodiment, the reference signal received power (RSRP) decreases as the terminal moves away from the central area of the cell.

In an embodiment, the configuration information may be a mapping relationship between the movement information and the acquisition period. It may also be an initial value of the acquisition period configured for the terminal by the base station.

In an embodiment, the configuration information may be a mapping relationship between the movement speed of the terminal and a corresponding acquisition period. Here, the movement speeds in different ranges may correspond to different acquisition periods. Here, the corresponding ratios between the different acquisition periods may be the same.

In an embodiment, when the terminal moves at a speed greater than a first speed threshold, the terminal is in a high speed moving state and is more likely to move to the edge area of the cell, and in this case, it is necessary to acquire the measurement information at a high frequency, and thus the acquisition period may be set to be less than a first period threshold.

When the terminal moves at a speed greater than a second speed threshold and less than the first speed threshold, the terminal in a medium speed moving state, and the acquisition period may be set to be greater than the first period threshold and less than a second period threshold.

When the terminal moves at a speed less than the second speed threshold, the terminal is in a low speed moving state, and the acquisition period may be set to be greater than the second period threshold. Here, the first speed threshold is greater than the second speed threshold, and the first period threshold is less than the second period threshold.

In this way, the acquisition period may be adjusted according to the movement speed of the terminal, so that the acquisition period may be adapted to the movement speed of the terminal. Since different acquisition periods correspond to different power consumption of the terminal, the power consumption of the terminal may be adjusted according to the acquisition period, which is conducive to saving the power consumption of the terminal and thus makes the terminal more power-saving.

In an embodiment, the configuration information may be a mapping relationship between a movement distance of the terminal and a corresponding acquisition period. Here, movement distances of different ranges may correspond to different acquisition periods. Here, the corresponding ratios between the different acquisition periods may be the same.

In an embodiment, when the movement distance determined by two consecutive positioning of the terminal is greater than a first distance threshold, the terminal may already be close to the edge area of the cell, and in this case, it is necessary to acquire the measurement information at a high frequency, and the acquisition period may be set to be less than a first period threshold.

When the movement distance determined by two consecutive positioning of the terminal is greater than a second distance threshold and less than the first distance threshold, the acquisition period may be set to be greater than the first period threshold and less than a second period threshold. When the movement distance determined by two consecutive positioning of the terminal is less than the second distance threshold, the terminal may still be located close to the central area of the cell, and the acquisition period may be set to be greater than the second period threshold.

Here, the first distance threshold is greater than the second distance threshold, and the first period threshold is less than the second period threshold.

In this way, the acquisition period may be adjusted according to the movement distance of the terminal, so that the acquisition period may be adapted to the movement distance of the terminal. Since different acquisition periods correspond to different power consumptions of the terminal, the power consumption of the terminal may be adjusted according to the acquisition period, which is conducive to saving the power consumption of the terminal and thus makes the terminal more power-saving.

In an embodiment, the movement distance may also be a relative distance of the location of the terminal relative to a reference point of the cell.

In an embodiment, the reference point of the cell may be the centre point of the cell.

In an embodiment, the configuration information may be a mapping relationship between a signal strength of a reference signal received by the terminal and a corresponding acquisition period. Here, the signal strengths of different ranges may correspond to different acquisition periods. Here, the corresponding ratios between the different acquisition periods may be the same.

In an embodiment, when the signal strength of the reference signal received by the terminal is less than a first signal strength threshold, the terminal may already be close to the edge area of the cell, and in this case, it is necessary to acquire the measurement information at a high frequency, and the acquisition period may be set to be less than a first period threshold.

When the signal strength of the reference signal received by the terminal is greater than the first signal strength threshold and less than a second signal strength threshold, the acquisition period may be set to be greater than the first period threshold and less than a second period threshold.

When the signal strength of the reference signal received by the terminal is greater than the second signal strength threshold, the terminal may still be located close to the central area of the cell, and the acquisition period may be set to be greater than the second period threshold. Here, the first signal strength threshold is less than the second strength threshold, and the first period threshold is less than the second period threshold.

In this way, the acquisition period may be adjusted according to the signal strength of the reference signal received by the terminal, so that the acquisition period may be adapted to the signal strength of the reference signal received by the terminal. Since different acquisition periods correspond to different power consumptions of the terminal, the power consumption of the terminal may be adjusted according to the acquisition period, which is conducive to saving power consumption of the terminal and thus makes the terminal more power-saving.

In an embodiment, the terminal acquires the measurement information according to the acquisition period currently determined.

In an embodiment of the present disclosure, the terminal, after receiving the configuration information for the terminal to acquire the measurement information, can determine the acquisition period for acquiring the measurement information according to the movement information and the configuration information. Since the acquisition period is related to the movement information and is determined according to a movement status of the terminal, in comparison to a manner of acquiring the measurement information by using a fixed acquisition period, the acquisition period may be adapted to the movement status of the terminal. Since different acquisition periods correspond to different power consumptions of the terminal, this helps to reduce the power consumption of the terminal.

It shall be noted and it will be understood by those skilled in the art that the method provided by embodiments of the present disclosure may be performed, either alone or together with some of the methods in embodiments of the present disclosure or in related art.

In an embodiment, the acquisition period includes:

an acquisition period of geographic location information of the terminal; and/or an acquisition period for the terminal to acquire a channel measurement result.

Here, the terminal, after acquiring the geographic location information of the terminal, may perform cell reselection and selection according to the geographic location information.

Here, the terminal, after acquiring the channel measurement result, may perform data transmission according to the channel measurement result to improve the quality of the data transmission.

In an embodiment, the configuration information includes:

a first period configuration including an initial value of the acquisition period; and a first period scaling configuration including a reference distance and a scaling factor, wherein the scaling factor corresponds to the reference distance and is configured to scale the initial value.

Here, the terminal, after receiving the configuration information, may perform the acquisition of the measurement information according to the initial value of the acquisition period configured in the configuration information.

In an embodiment, the acquisition period may be adjusted by scaling the initial value according to the set scaling factor. For example, if the initial value of the acquisition period is 1.5 and the scaling factor is $\frac{1}{3}$, the scaled acquisition period is 0.5.

In an embodiment, the reference distance may be a relative distance between the location of the terminal in a current acquisition of the measurement information and the location of the terminal in a previous acquisition of the measurement information.

In an embodiment, different reference distances may correspond to different scaling factors for scaling the initial value. In this way, the terminal, after acquiring the reference distance, may acquire, according to the first period scaling configuration, the scaling factor corresponding to the reference value and scaling the initial value, and then acquire the acquisition period. For example, the scaling factor in the first period scaling configuration is $\frac{1}{2}$ when the reference distance is 10 m, and the initial value is 1 s, then when the terminal acquires a measured distance of 10 m, the corresponding scaling factor is $\frac{1}{2}$, and the acquisition period may be obtained by multiplying the initial value 1 with the scaling factor $\frac{1}{2}$, i.e. the acquisition period is equal to 0.5.

In an embodiment, the scaling factor is less than a scaling factor threshold when the reference distance is greater than a distance threshold.

In an embodiment, there is a linear relationship between the reference distance and a corresponding scaling factor. The relationship between the reference distance and the corresponding scaling factor may be represented by a linear function.

In an embodiment, there is an inversely proportional relationship between the reference distance and the corresponding scaling factor, and the proportionality coefficient thereof may be k, i.e., the scaling factor is equal to a value by multiplying k with the reference distance, where $0<k<1$. Therefore, after any measured distance is acquired, the scaling factor corresponding to the measured distance may be determined according to the proportional relationship between the reference distance and the corresponding scaling factor.

In an embodiment, the relationship between the reference distance and the corresponding scaling factor may not be linear. The relationship between the reference distance and the corresponding scaling factor may be represented by a non-linear function.

In an embodiment, when the reference distance is A, the scaling factor is a, and when the reference distance is B, the scaling factor is b, where A>B and a<b. If the measured distance is C and A>C>B, the scaling factor c corresponding to the measured distance C may be any value between greater than a and less than b. For example, c may be (a+b)/2. It should be noted that the corresponding relationship between A and a and that between B and b may be stored in the terminal in advance, and that the corresponding relationship between C and c may be derived according to a determination rule in this embodiment. In this way, once any measured distance has been acquired, the scaling factor corresponding to that measured distance may be determined according to the correspondence between the reference distance and the corresponding scaling factor.

Figure 5:
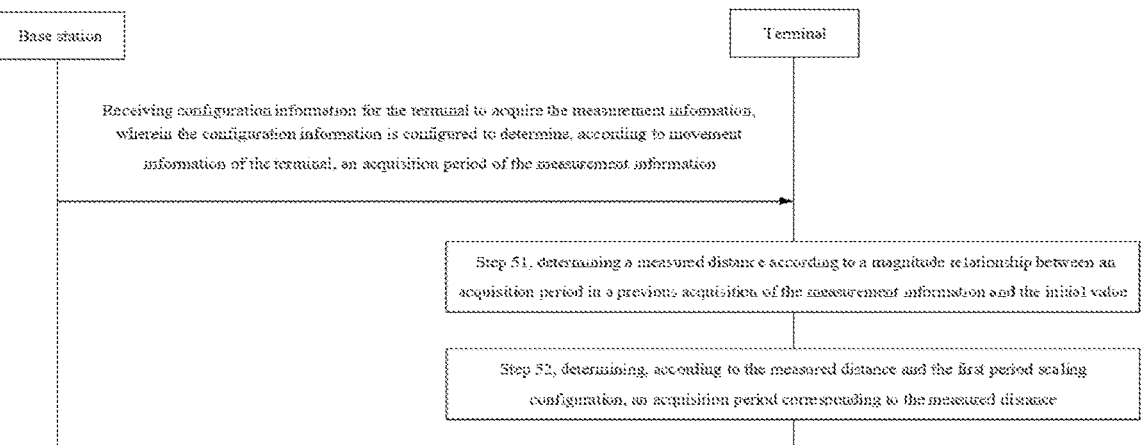
FIG. 5 is a flow diagram of a method for acquiring measurement information by a terminal according to an embodiment.

As shown in FIG. 5, an embodiment provides a method for acquiring measurement information by a terminal. The movement information includes a measured distance, and the method includes:

step 51, determining the measured distance according to a magnitude relationship between an acquisition period in a previous acquisition of the measurement information and the initial value; and step 52, determining, according to the measured distance and the first period scaling configuration, an acquisition period corresponding to the measured distance.

In an embodiment, the terminal determines a next acquisition period of the terminal according to the movement distance in the acquisition period of the previous acquisition of the measurement information, and in order to accurately adjust the acquisition period, the movement distance corresponding to the acquisition period of the previous acquisition of the measurement information may be normalized to the movement distance corresponding to the initial value, and the movement distance is taken as the measured distance. For example, if the initial value is 1 s, the acquisition period of the previous acquisition of the measurement information is 0.5, and the movement distance of the terminal in the acquisition period of the previous acquisition of the measurement information is 10 m, the measured distance is equal to 20 m after normalizing the movement distance corresponding to the acquisition period of the previous acquisition of the measurement information to the movement distance corresponding to the initial value. If in the first period scaling configuration, the scaling factor corresponding to the reference distance of 20 m is ½, the acquisition period corresponding to the measured distance is 0.5 s.

In an embodiment, when the acquisition period of the previous acquisition of the measurement information is equal to the initial value, the normalization process in the technical solution described above is not required. The movement distance corresponding to the acquisition period of the previous acquisition of the measurement information may be determined as the measured distance.

It shall be noted and it will be understood by those skilled in the art that the method provided by embodiments of the present disclosure may be performed, either alone or together with some of the methods in embodiments of the present disclosure or in related art.

Figure 6:
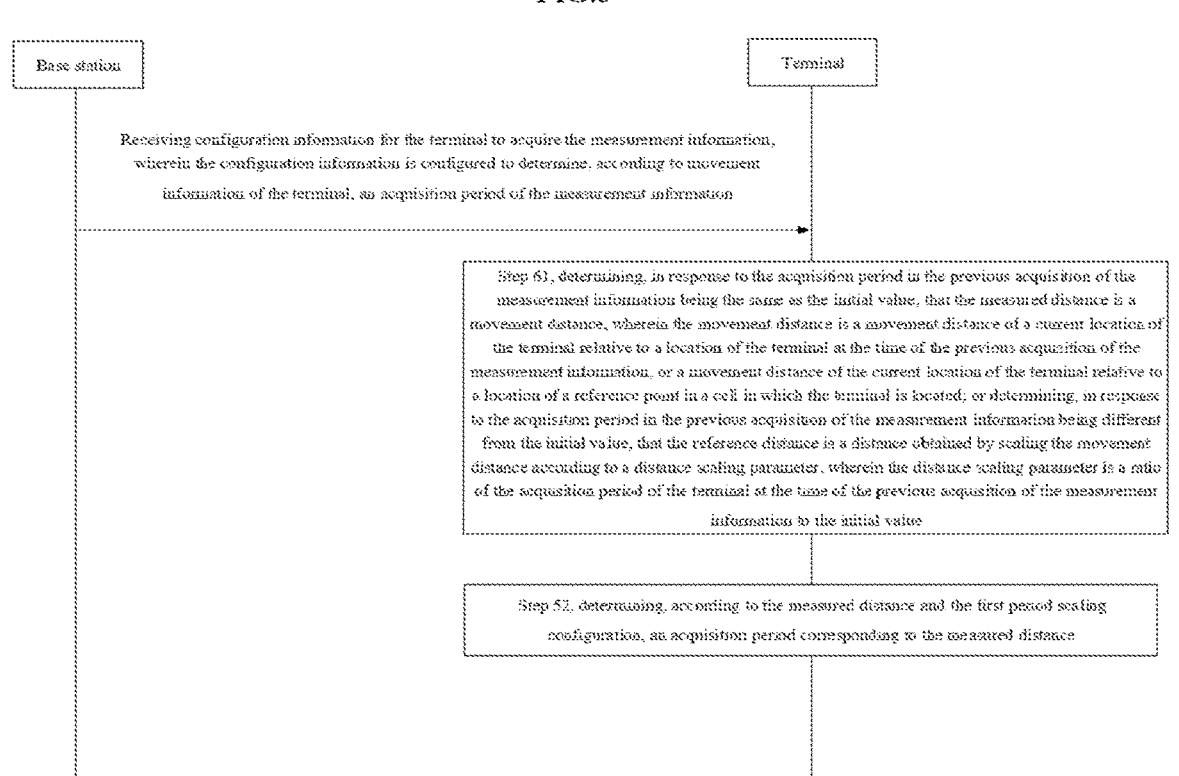
FIG. 6 is a flow diagram of a method for acquiring measurement information by a terminal according to an embodiment.

As shown in FIG. 6, an embodiment provides a method for acquiring measurement information by a terminal, in which step 51 of determining the measured distance according to the magnitude relationship between the acquisition period in the previous acquisition of the measurement information and the initial value includes:

step 61, determining, in response to the acquisition period in the previous acquisition of the measurement information being the same as the initial value, that the measured distance is a movement distance, wherein the movement distance is a movement distance of a current location of the terminal relative to a location of the terminal at the time of the previous acquisition of the measurement information, or a movement distance of the current location of the terminal relative to a location of a reference point in a cell in which the terminal is located; or determining, in response to the acquisition period in the previous acquisition of the measurement information being different from the initial value, that the measured distance is a distance obtained by scaling the movement distance according to a distance scaling parameter, wherein the distance scaling parameter is a ratio of the acquisition period of the terminal at the time of the previous acquisition of the measurement information to the initial value.

Here, the acquisition period at the previous acquisition of the measurement information may be an acquisition period of an acquisition of the measurement information by the terminal prior to the current acquisition of the geographic location information.

In an embodiment, when the acquisition period of the previous acquisition of the measurement information is the same as the initial value, there is no need to perform the normalization process on the movement distance.

In an embodiment, at the current location, the terminal acquires the geographic location information of the terminal using the already determined acquisition period, so that the movement distance of the current location of the terminal relative to the location of the terminal at the time of the previous acquisition of the measurement information may be determined.

In an embodiment, the movement distance may be a straight-line distance of the current location of the terminal relative to the location of the terminal at the time of the previous acquisition of the measurement information.

In an embodiment, the movement distance may be a straight-line distance of the current location of the terminal relative to the location of the reference point in the cell in which the terminal is located.

In an embodiment, when the acquisition period of the previous acquisition of the measurement information is different from the initial value, the normalization of the movement distance is required. Here, the movement distance may be normalized using the distance scaling parameter to acquire the measured distance. For example, if the initial value is 1 s, the acquisition period of the previous acquisition of the measurement information is 0.5, the movement distance of the terminal in the acquisition period of the previous acquisition of the measurement information is 10 m, the distance scaling parameter is ½, and then the measured distance is equal to 20 m after normalizing the movement distance corresponding to the acquisition period of the previous acquisition of the measurement information to the movement distance corresponding to the initial value. If in the first period scaling configuration, the scaling factor corresponding to the reference distance of 20 m is ½, the acquisition period corresponding to the measured distance is 0.5 s.

In an embodiment, the scaling factor is less than a factor threshold when the reference distance is greater than a distance threshold, and the scaling factor is greater than the factor threshold when the reference distance is less than the distance threshold. In this way, the scaling factor may be adapted to the reference distance, making the scaling factor more adaptable to the movement of the terminal.

It shall be noted and it will be understood by those skilled in the art that the method provided by embodiments of the present disclosure may be performed, either alone or together with some of the methods in embodiments of the present disclosure or in related art.

In an embodiment, the configuration information includes:

a first period configuration including an initial value of the acquisition period; and a second period scaling configuration including a speed level and a scaling factor, wherein the scaling factor corresponds to the speed level and is configured to scale the initial value.

Here, the terminal, after receiving the configuration information, may perform the acquisition of the measurement information according to the initial value of the acquisition period configured in the configuration information.

In an embodiment, the acquisition period may be adjusted by scaling the initial value according to the set scaling factor. For example, if the initial value of the acquisition period is 1.5 and the scaling factor is 1/3, the scaled acquisition period is 0.5.

In an embodiment, the speed level may be a speed level corresponding to different movement speeds.

In an embodiment, when the movement speed of the terminal is less than a first speed threshold, the speed level corresponding to the terminal is a low speed level; when the movement speed of the terminal is less than a second speed threshold and greater than the first speed threshold, the speed level corresponding to the terminal is a medium speed level; and when the movement speed of the terminal is greater than the second speed threshold, the speed level corresponding to the terminal is a high speed level. Here, the first speed threshold is less than the second speed threshold.

In an embodiment, the movement speed of the terminal may be an average speed of the terminal during the previous period before the current acquisition of the geographic location information.

In an embodiment, different speed levels may correspond to different scaling factors for scaling the initial value. In this way, the terminal, after acquiring the speed level, may acquire, according to the second period scaling configuration, the scaling factor corresponding to the speed level and scaling the initial value, and then acquire the acquisition period. For example, in the second period scaling configuration, the scaling factor is 1/2 when the speed level is a high speed level, and the initial value is 1, therefore when the speed level acquired by the terminal is the high speed level, the obtained acquisition period is 0.5.

Figures 7, 8:
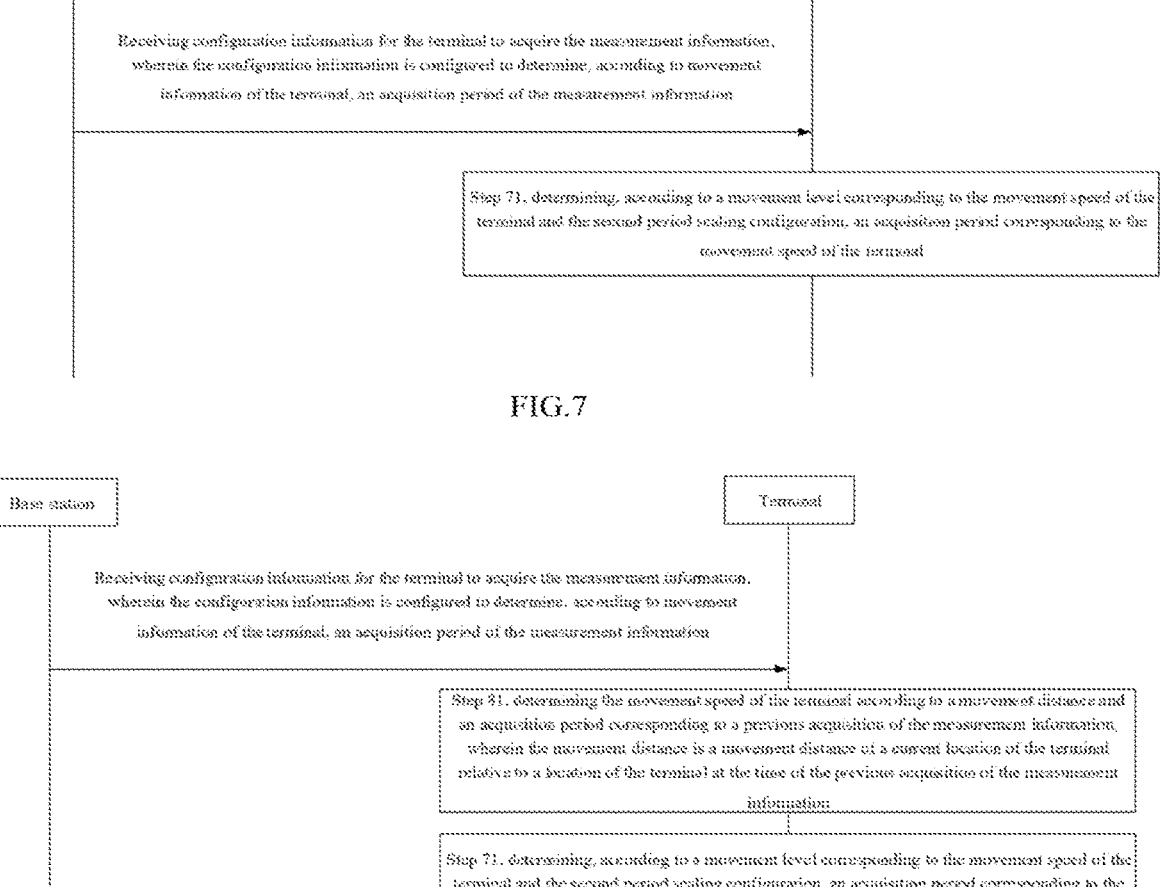
FIG. 7 is a flow diagram of a method for acquiring measurement information by a terminal according to an embodiment.
FIG. 8 is a flow diagram of a method for acquiring measurement information by a terminal according to an embodiment.

As shown in FIG. 7, an embodiment provides a method for acquiring measurement information by a terminal, in which the movement information includes a movement speed of the terminal. The method includes:

step 71, determining, according to a movement level corresponding to the movement speed of the terminal and the second period scaling configuration, an acquisition period corresponding to the movement speed of the terminal.

In an embodiment, when the movement speed of the terminal is less than a first speed threshold, the speed level corresponding to the terminal is a first level; when the movement speed of the terminal is less than a second speed threshold and greater than the first speed threshold, the speed level corresponding to the terminal is a second level; and when the movement speed of the terminal is greater than the second speed threshold, the speed level corresponding to the terminal is a third level. Here, the first speed threshold is less than the second speed threshold.

In an embodiment, the movement speed of the terminal may be an average speed of the terminal during the previous period before the current acquisition of the geographic location information.

In an embodiment, different speed levels may correspond to different scaling factors for scaling the initial value. In this way, the terminal, after acquiring the speed level, may acquire, according to the second period scaling configuration, the scaling factor corresponding to the speed level and scaling the initial value, and then acquire the acquisition period. For example, in the second period scaling configuration, the scaling factor is 1/3 when the speed level is the first level, and the initial value is 1.5, therefore when the speed level acquired by the terminal is the first level, the corresponding scaling factor is 1/3, and the obtained acquisition period is 0.5.

It shall be noted and it will be understood by those skilled in the art that the method provided by embodiments of the present disclosure may be performed, either alone or together with some of the methods in embodiments of the present disclosure or in related art.

As shown in FIG. 8, an embodiment provides a method for acquiring measurement information by a terminal, and the method includes:

step 81, determining the movement speed of the terminal according to a movement distance and an acquisition period corresponding to a previous acquisition of the measurement information, wherein the movement distance is a movement distance of a current location of the terminal relative to a location of the terminal at the time of the previous acquisition of the measurement information.

In an embodiment, at the current location, the terminal acquires the geographic location information of the terminal using the already determined acquisition period, so that the movement distance of the current location of the terminal relative to the location of the terminal at the time of the previous acquisition of the measurement information may be determined.

In an embodiment, the movement distance may be a straight-line distance between the current location of the terminal and the location of the terminal at the time of the previous acquisition of the measurement information. By dividing the straight-line distance by the acquisition period corresponding to the previous acquisition of the measurement information, an average movement speed of the terminal may be determined. The acquisition period corresponding to the average movement speed of the terminal may be determined according to the movement level corresponding to this average movement speed and the second period scaling configuration.

It shall be noted and it will be understood by those skilled in the art that the method provided by embodiments of the present disclosure may be performed, either alone or together with some of the methods in embodiments of the present disclosure or in related art.

Figures 9, 10:
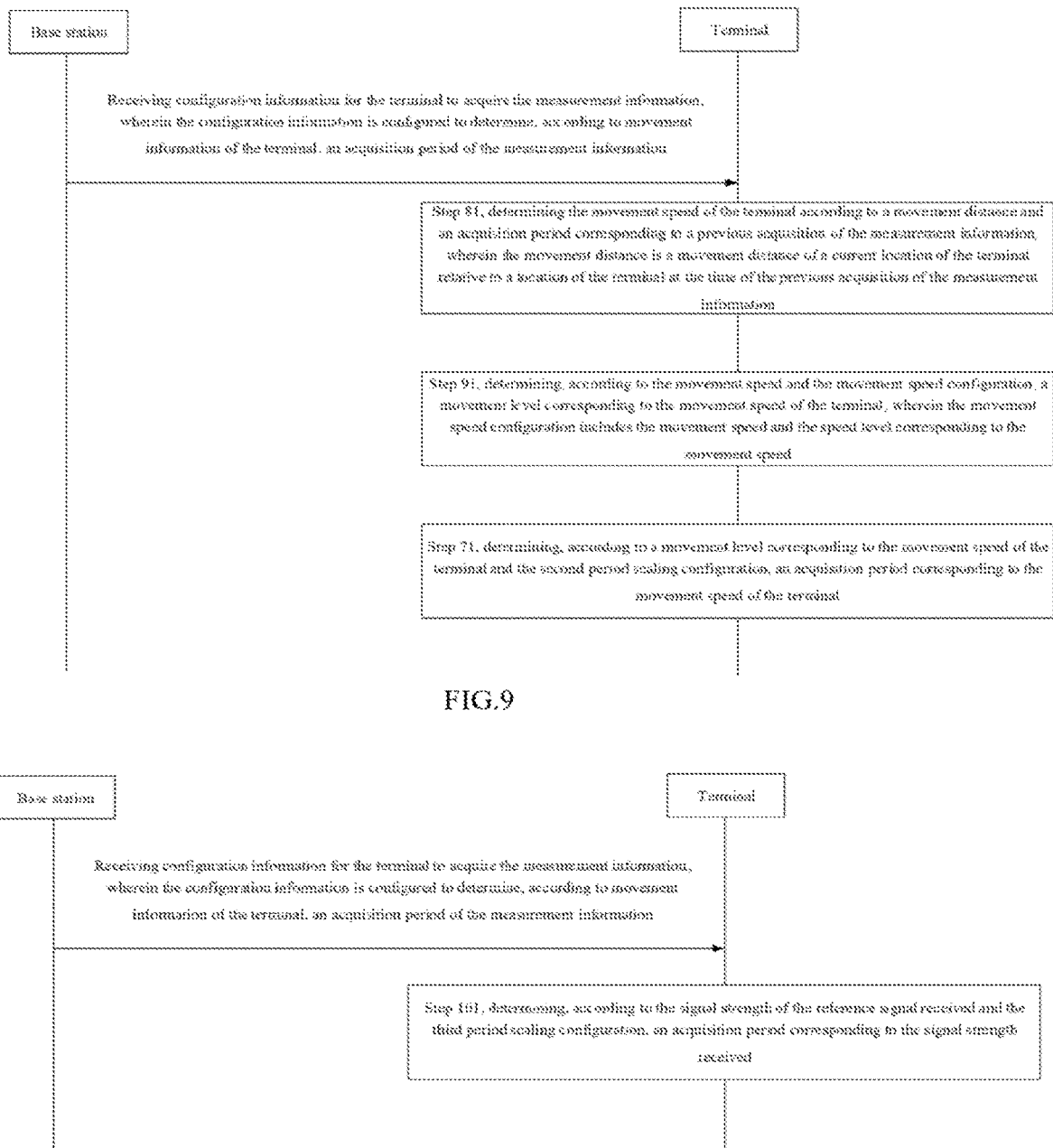
FIG. 9 is a flow diagram of a method for acquiring measurement information by a terminal according to an embodiment.
FIG. 10 is a flow diagram of a method for acquiring measurement information by a terminal according to an embodiment.

As shown in FIG. 9, an embodiment provides a method for acquiring measurement information by a terminal, in which the configuration information further includes a movement speed configuration. The method includes:

step 91, determining, according to the movement speed and the movement speed configuration, a movement level corresponding to the movement speed of the terminal, wherein the movement speed configuration includes the movement speed and the speed level corresponding to the movement speed.

In an embodiment, different movement speeds correspond to different speed levels.

In an embodiment, when the movement speed of the terminal is less than a first speed threshold, the speed level corresponding to the terminal is a first level; when the movement speed of the terminal is less than a second speed threshold and greater than the first speed threshold, the speed level corresponding to the terminal is a second level; and when the movement speed of the terminal is greater than the second speed threshold, the speed level corresponding to the terminal is a third level. Here, the first speed threshold is less than the second speed threshold.

In an embodiment, the movement distance may be a straight-line distance between the current location of the terminal and the location of the terminal at the time of the previous acquisition of the measurement information. By dividing the straight-line distance by the acquisition period corresponding to the previous acquisition of the measurement information, an average movement speed of the terminal may be determined. The acquisition period corresponding to the average movement speed of the terminal may be determined according to the movement level corresponding to this average movement speed and the movement speed configuration.

In an embodiment, the configuration information includes:

a first period configuration including an initial value of the acquisition period; and a third period scaling configuration including a signal strength and a scaling factor, wherein the scaling factor corresponds to the signal strength and is configured to scale the initial value.

Here, the terminal, after receiving the configuration information, may perform the acquisition of the measurement information according to the initial value of the acquisition period configured by the configuration information.

In an embodiment, the signal strength may be the signal strength of a reference signal received by the terminal. Here, the signal strength is greater than a signal strength threshold when the terminal is in the central area of the cell, and is less than the signal strength threshold when the terminal is in the edge area of the cell.

In an embodiment, the acquisition period may be adjusted by scaling the initial value according to a set scaling factor. For example, if the initial value of the acquisition period is 1.5 and the scaling factor is ⅓, the scaled acquisition period is 0.5.

In an embodiment, different signal strengths correspond to different scaling factors for scaling the initial value.

In an embodiment, the signal strength may be either a reference signal received power (RSRP) or a reference signal received quality (RSRQ).

In an embodiment, the signal strength may be an average of the reference signals collected during a sampling time period.

In an embodiment, the terminal, after acquiring the signal strength, may determine a scaling factor corresponding to the signal strength according to the relationship, in the third period scaling configuration, between the signal strength and the scaling factor corresponding to the signal strength and scaling the initial value, and obtain the acquisition period according to the scaling factor. For example, in the third period scaling configuration, the corresponding scaling factor is ½ when the signal strength is a value of A, and the initial value is 1, then when the terminal receives a reference signal with a signal strength of A, the acquisition period acquired is 0.5.

It shall be noted and it will be understood by those skilled in the art that the method provided by embodiments of the present disclosure may be performed, either alone or together with some of the methods in embodiments of the present disclosure or in related art.

As shown in FIG. 10, an embodiment provides a method for acquiring measurement information by a terminal, in which the movement information includes a signal strength of a reference signal received when the terminal moves. The method includes:

step 101, determining, according to the signal strength of the reference signal received and the third period scaling configuration, an acquisition period corresponding to the signal strength received.

In an embodiment, when the signal strength of the terminal is less than a first signal strength threshold, the scaling factor corresponding to the terminal is a first value; when the signal strength of the terminal is less than a second signal strength threshold and greater than the first signal strength threshold, the scaling factor corresponding to the terminal is a second value; and when the signal strength of the terminal is greater than the second value, the scaling factor corresponding to the terminal is a third value. Here, the first signal strength threshold is less than the second signal strength threshold. In an embodiment, the first value is greater than the second value and the second value is greater than the third value.

In an embodiment, the signal strength may be either a reference signal received power (RSRP) or a reference signal received quality (RSRQ).

In an embodiment, the signal strength may be an average of the reference signals collected during a sampling time period.

The configuration information includes:

configuration information sent by a base station via a broadcast message; and/or configuration information sent by the base station via a radio resource control (RRC) message.

In an embodiment, the configuration information may be one or more of the configuration information in the present disclosure.

In an embodiment, sending the configuration information by using the wireless resource control (RRC) message may enhance the compatibility of the wireless resource control (RRC) message.

It shall be noted and it will be understood by those skilled in the art that the method provided by embodiments of the present disclosure may be performed, either alone or together with some of the methods in embodiments of the present disclosure or in related art.

Figures 11, 12:
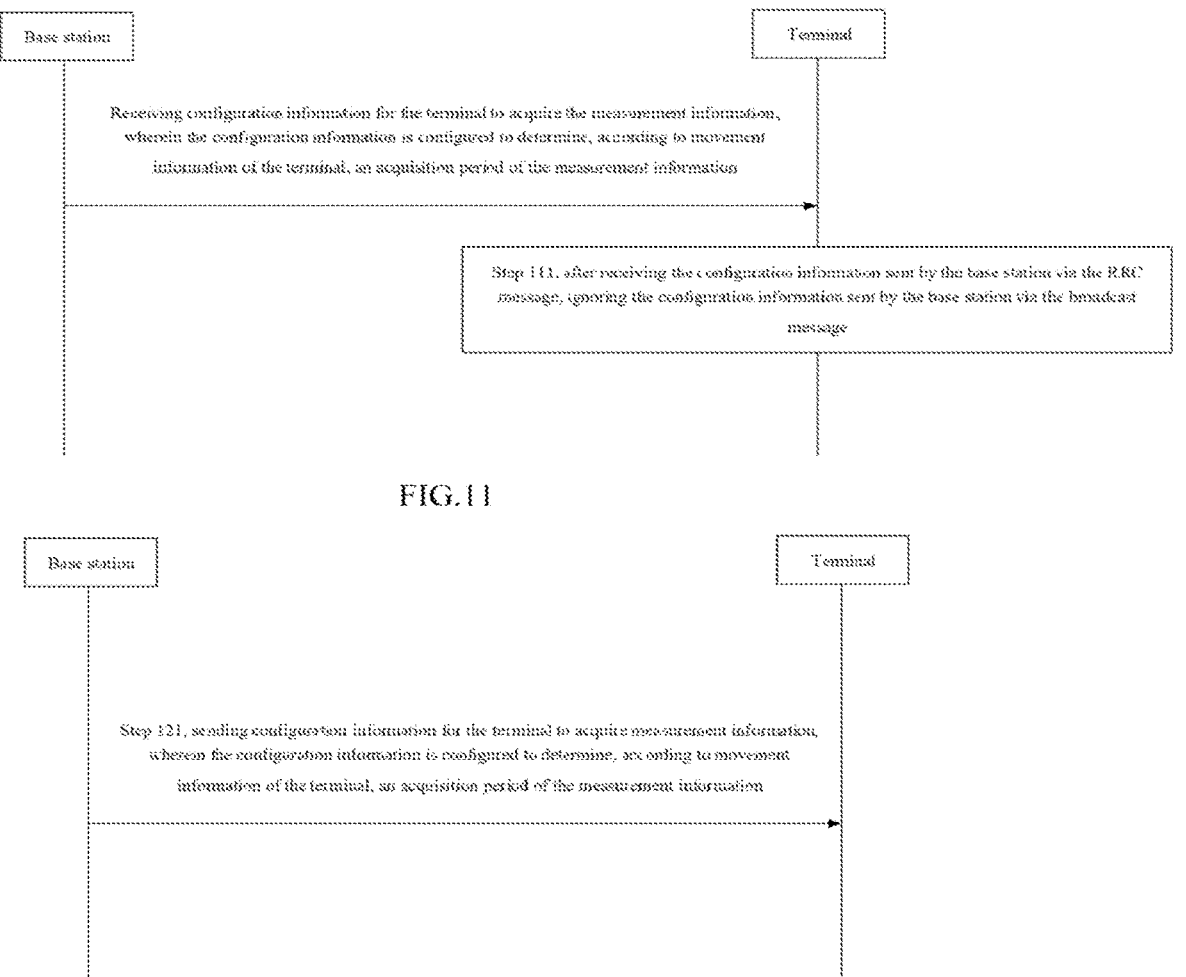
FIG. 11 is a flow diagram of a method for acquiring measurement information by a terminal according to an embodiment.
FIG. 12 is a flow diagram of a method for acquiring measurement information by a terminal according to an embodiment.

As shown in FIG. 11, an embodiment provides a method for acquiring measurement information by a terminal, and the method further includes:

step 111, after receiving the configuration information sent by the base station via the RRC message, ignoring the configuration information sent by the base station via the broadcast message.

In this way, the terminal uses only the configuration information sent by the base station via the radio resource control (RRC) message to determine the acquisition period, which avoids the case where the terminal needs to receive the configuration information frequently.

For further understanding of the present technical solution, the technical solution is further described by means of 2 example embodiments as follows.

Example 1: The Wireless Communication System Includes a Base Station and a Terminal In step a1, the base station broadcasts, to the terminal, configuration information for the terminal to acquire measurement information.

The configuration information is configured to determine, according to movement information of the terminal, an acquisition period of geographic location information. The configuration information at least includes an initial value of the acquisition period, and a reference distance and a scaling factor corresponding to the reference distance and scaling the initial value.

Here, the initial value of the acquisition period for acquiring the geographic location information is 1 s, and the reference distance and the scaling factor corresponding to the reference distance and scaling the initial value are that when the reference distance is 10 m, the scaling factor is 0.5, when the reference distance is 5 m, the scaling factor is 1, and when the reference distance is 1 m, the scaling factor is 1.5.

In step a2, the terminal receives the configuration information.

In step a3, the terminal acquires the geographic location information from an application layer of the terminal according to the acquisition period of 1 s, acquires, by calculation, the distance between the current location of the terminal and the location of the terminal at the time of the previous acquisition of the geographic location information is 11 m, determines that the scaling factor is 0.5 according to the configuration information, and acquires that the scaled period is 0.5 s.

In step a4, the terminal acquires the geographic location information from the application layer of the terminal according to the acquisition period of 0.5 s, acquires, by calculation, the distance between the current location of the terminal and the location of the terminal at the time of the previous acquisition of the geographic location information is 6 m, determines that a ratio between the initial value and the period of the previous acquisition of the geographic location information of the terminal is 2, scales 6 m by 2 to obtain the scaled distance of 12 m, determines, according to the configuration information, that the 12 m corresponds to the scaling factor of 0.5, and determines, according to the initial value and the scaling factor, that the acquisition period is 0.5 s.

Example 2

In step b1, the base station sends, to the terminal, configuration information for the terminal to acquire measurement information via a radio resource control (RRC) message. The configuration information is configured to determine, according to movement information of the terminal, an acquisition period of geographic location information. The configuration information at least includes an initial value of the acquisition period, a speed level and a scaling factor corresponding to the speed level and scaling the initial value, and a movement speed and a speed level corresponding to the movement speed.

Here, the initial value of the acquisition period for acquiring the geographic location information is 1 s. The speed level and the acquisition period corresponding to the speed level are that when it is a high speed level, the acquisition period is 0.5 s, when it is a medium speed level, the acquisition period is 1 s, and when it is a low speed level, the acquisition period is 1.5 s. The movement speed and the speed level corresponding to the movement speed are that when the movement speed is less than 1 m/s, the corresponding speed is a low speed level, when the movement speed is greater than 1 m/s and less than the corresponding speed level is a medium speed level, and when the movement speed is greater than 10 m/s, the corresponding speed level is a high speed level.

In step b2, the geographic location information is acquired from the application layer of the terminal according to the acquisition period of 1 s, a distance between the current location of the terminal and the location of the terminal at the time of the previous acquisition of the geographic location information is acquired to be 11 m via calculation, the speed is determined to be 11 m/s, and the terminal is determined to be in the high speed level.

In step b3, the scaling factor of the terminal is determined to be 0.5 according to the configuration information, and the acquisition period is determined to be 0.5 s according to the initial value and the scaling factor.

As shown in FIG. 12, an embodiment provides a method for acquiring measurement information by a terminal. The method is applied to a base station and the method includes:

step 121, sending configuration information for the terminal to acquire measurement information.

The configuration information is configured to determine, according to movement information of the terminal, an acquisition period of the measurement information.

In some embodiments, the terminal may be, but is not limited to being, a mobile phone, a wearable device, a vehicle-mounted terminal, a road side unit (RSU), a smart home terminal, an industrial sensing device and/or a medical device and the like.

In an embodiment, the base station is an interface device for the terminal to access the network. Here, the network may be a non-terrestrial network (NTN).

In some embodiments, the base station may be provided on a high altitude platform station or on a satellite.

In some embodiments, the base station may be a base station of various types, for example, a base station for the third generation mobile communication (3G) network, a base station for the 4th generation mobile communication (4G) network, a base station for the 5th generation mobile communication (5G) network or other evolved base stations.

In some embodiments, a cell in which the terminal is located may be a cell in the non-terrestrial network (NTN).

In an embodiment, the terminal may acquire location information of the terminal via the global positioning system (GPS), determine whether the terminal is located in an edge area or a central area of a cell of the non-terrestrial network (NTN) according to the location information, and perform cell reselecting or switching by using location relationship of the terminal within the cell of the non-terrestrial network (NTN).

In some embodiments, when the terminal is located in the central area of the cell of the non-terrestrial network (NTN) or the distance between the location of the terminal and the central area is within a distance threshold, the terminal does not need cell reselecting or switching, at which time the terminal may stop acquiring the location information of the terminal or may use an acquisition period greater than a period threshold to acquire the location information of the terminal, in order to save power consumption of the terminal.

In an embodiment, the measurement information acquired by the terminal is the location information for cell reselecting or switching.

In some embodiments, when the terminal is located in the edge area of the cell of the non-terrestrial network (NTN) or the distance between the location of the terminal and the edge area is within a distance threshold, the terminal may need to perform cell reselecting or switching, at which time the terminal needs to start acquiring the location information of the terminal or adopt an acquisition period smaller than a period threshold to acquire the location information of the terminal, so as to achieve cell reselecting or switching.

In an embodiment, the measurement information acquired by the terminal is channel measurement result information for transmitting data, and the terminal performs data transmission in the non-terrestrial network (NTN) according to the channel measurement result.

In an embodiment, a measurement object included in the channel measurement result may include at least one of a reference signal received power (RSRP), a reference signal received quality (RSRQ) and a received signal strength indicator (RSSI).

In some embodiments, when the terminal is located in the central area of the cell of the non-terrestrial network (NTN) or the distance between the location of the terminal and the central area is within a distance threshold, the data transmission quality of the terminal is good, at which time the terminal may stop acquiring a channel measurement result or use an acquisition period greater than a period threshold to acquire the channel measurement result, in order to save power consumption of the terminal.

In some embodiments, when the terminal is located in the edge area of the cell of the non-terrestrial network (NTN) or the distance between the location of the terminal and the edge area is within the distance threshold, the data transmission quality of the terminal is poor, at which time the terminal needs to start acquiring the channel measurement result or adopt an acquisition period smaller than the period threshold to acquire the channel measurement result, in order to achieve stable data transmission.

In some embodiments, the measurement information may include information about the location of the terminal and/or information about the channel measurement result.

In an embodiment, the terminal may acquire the measurement information from the base station.

In another embodiment, the terminal may acquire the measurement information from an application layer of the terminal.

In an embodiment, when the acquisition period is determined, the terminal sends a request for geographic location information to the application layer of the terminal according to the acquisition period to acquire geographic location information from the application layer of the terminal.

In an embodiment, the terminal may periodically acquire the measurement information. Here, the acquisition period may be a period in which the terminal periodically acquires the measurement information.

In an embodiment, the terminal may receive, from the base station, the configuration information for the terminal to acquire the measurement information when the terminal establishes a radio resource control (RRC) connection with the base station.

In an embodiment, when the terminal needs to acquire the measurement information, the terminal sends an acquisition request for the measurement information to the base station, and the base station, upon receiving the acquisition request from the terminal, sends the configuration information for the terminal to acquire the measurement information to the terminal.

In an embodiment, in response to the terminal being activated, the acquisition request for the measurement information is sent to the base station, and the base station, after receiving the acquisition request from the terminal, sends the configuration information for the terminal to acquire the measurement information to the terminal.

In an embodiment, the movement information may be information of the movement of the terminal, for example, a movement speed of the terminal and a movement distance of the terminal. It shall be noted that the movement information may also be information associated with the movement of the terminal, for example, reference signal received power (RSRP) and reference signal received quality (RSRQ) corresponding to a reference signal sent by the base station to the terminal, and the like. In an embodiment, the reference signal received power (RSRP) decreases as the terminal moves away from the central area of the cell.

In an embodiment, the configuration information may be a mapping relationship between the movement information and the acquisition period. It may also be an initial value of the acquisition period configured for the terminal by the base station.

In an embodiment, the configuration information may be a mapping relationship between the movement speed of the terminal and a corresponding acquisition period. Here, the movement speeds in different ranges may correspond to different acquisition periods. Here, the corresponding ratios between the different acquisition periods may be the same.

In an embodiment, when the terminal moves at a speed greater than a first speed threshold, the terminal is in a high speed moving state and is more likely to move to the edge area of the cell, and in this case, it is necessary to acquire the measurement information at a high frequency, and thus the acquisition period may be set to be less than a first period threshold. When the terminal moves at a speed greater than a second speed threshold and less than the first speed threshold, the terminal in a medium speed moving state, and the acquisition period may be set to be greater than the first period threshold and less than a second period threshold. When the terminal moves at a speed less than the second speed threshold, the terminal is in a low speed moving state, and the acquisition period may be set to be greater than the second period threshold. Here, the first speed threshold is greater than the second speed threshold, and the first period threshold is less than the second period threshold. In this way, the acquisition period may be adjusted according to the movement speed of the terminal, so that the acquisition period may be adapted to the movement speed of the terminal. Since different acquisition periods correspond to different power consumption of the terminal, the power consumption of the terminal may be adjusted according to the acquisition period, which is conducive to saving the power consumption of the terminal and thus makes the terminal more power-saving.

In an embodiment, the configuration information may be a mapping relationship between a movement distance of the terminal and a corresponding acquisition period. Here, movement distances of different ranges may correspond to different acquisition periods. Here, the corresponding ratios between the different acquisition periods may be the same.

In an embodiment, when the movement distance determined by two consecutive positioning of the terminal is greater than a first distance threshold, the terminal may already be close to the edge area of the cell, and in this case, it is necessary to acquire the measurement information at a high frequency, and the acquisition period may be set to be less than a first period threshold. When the movement distance determined by two consecutive positioning of the terminal is greater than a second distance threshold and less than the first distance threshold, the acquisition period may be set to be greater than the first period threshold and less than a second period threshold. When the movement distance determined by two consecutive positioning of the terminal is less than the second distance threshold, the terminal may still be located close to the central area of the cell, and the acquisition period may be set to be greater than the second period threshold. Here, the first distance threshold is greater than the second distance threshold, and the first period threshold is less than the second period threshold. In this way, the acquisition period may be adjusted according to the movement distance of the terminal, so that the acquisition period may be adapted to the movement distance of the terminal. Since different acquisition periods correspond to different power consumptions of the terminal, the power consumption of the terminal may be adjusted according to the acquisition period, which is conducive to saving the power consumption of the terminal and thus makes the terminal more power-saving.

In an embodiment, the movement distance may also be a relative distance of the location of the terminal relative to a reference point of the cell.

In an embodiment, the configuration information may be a mapping relationship between a signal strength of a reference signal received by the terminal and a corresponding acquisition period. Here, the signal strengths of different ranges may correspond to different acquisition periods. Here, the corresponding ratios between the different acquisition periods may be the same.

In an embodiment, when the signal strength of the reference signal received by the terminal is less than a first signal strength threshold, the terminal may already be close to the edge area of the cell, and in this case, it is necessary to acquire the measurement information at a high frequency, and the acquisition period may be set to be less than a first period threshold. When the signal strength of the reference signal received by the terminal is greater than the first signal strength threshold and less than a second signal strength threshold, the acquisition period may be set to be greater than the first period threshold and less than a second period threshold. When the signal strength of the reference signal received by the terminal is greater than the second signal strength threshold, the terminal may still be located close to the central area of the cell, and the acquisition period may be set to be greater than the second period threshold. Here, the first signal strength threshold is less than the second strength threshold, and the first period threshold is less than the second period threshold. In this way, the acquisition period may be adjusted according to the signal strength of the reference signal received by the terminal, so that the acquisition period may be adapted to the signal strength of the reference signal received by the terminal. Since different acquisition periods correspond to different power consumptions of the terminal, the power consumption of the terminal may be adjusted according to the acquisition period, which is conducive to saving power consumption of the terminal and thus makes the terminal more power-saving.

In an embodiment, the terminal acquires the measurement information according to the acquisition period currently determined.

In an embodiment of the present disclosure, the terminal, after receiving the configuration information for the terminal to acquire the measurement information, can determine the acquisition period for acquiring the measurement information according to the movement information and the configuration information. Since the acquisition period is related to the movement information and is determined according to a movement status of the terminal, in comparison to a manner of acquiring the measurement information by using a fixed acquisition period, the acquisition period may be adapted to the movement status of the terminal. Since different acquisition periods correspond to different power consumptions of the terminal, this helps to reduce the power consumption of the terminal.

It shall be noted and it will be understood by those skilled in the art that the method provided by embodiments of the present disclosure may be performed, either alone or together with some of the methods in embodiments of the present disclosure or in related art.

In an embodiment, the acquisition period includes:

an acquisition period of geographic location information of the terminal; and/or an acquisition period for the terminal to acquire a channel measurement result.

Here, the terminal, after acquiring the geographic location information of the terminal, may perform cell reselection and selection according to the geographic location information.

Here, the terminal, after acquiring the channel measurement result, may perform data transmission according to the channel measurement result to improve the quality of the data transmission.

In an embodiment, the configuration information includes:

a first period configuration including an initial value of the acquisition period; and a first period scaling configuration including a reference distance and a scaling factor, wherein the scaling factor corresponds to the reference distance and is configured to scale the initial value.

Here, the terminal, after receiving the configuration information, may perform the acquisition of the measurement information according to the initial value of the acquisition period configured in the configuration information.

In an embodiment, the acquisition period may be adjusted by scaling the initial value according to the set scaling factor. For example, if the initial value of the acquisition period is 1.5 and the scaling factor is ⅓, the scaled acquisition period is 0.5.

In an embodiment, the reference distance may be a relative distance between the location of the terminal in a current acquisition of the measurement information and the location of the terminal in a previous acquisition of the measurement information.

In an embodiment, different reference distances may correspond to different scaling factors for scaling the initial value. In this way, the terminal, after acquiring the reference distance, may acquire, according to the first period scaling configuration, the scaling factor corresponding to the reference value and scaling the initial value, and then acquire the acquisition period. For example, the scaling factor in the first period scaling configuration is ½ when the reference distance is 10 m, and the initial value is 1 s, then when the terminal acquires the reference distance of 10 m, the corresponding scaling factor is ½, and the acquisition period acquired is 0.5.

In an embodiment, the configuration information includes:

a first period configuration including an initial value of the acquisition period; and a second period scaling configuration including a speed level and a scaling factor, wherein the scaling factor corresponds to the speed level and is configured to scale the initial value.

Here, the terminal, after receiving the configuration information, may perform the acquisition of the measurement information according to the initial value of the acquisition period configured in the configuration information.

In an embodiment, the acquisition period may be adjusted by scaling the initial value according to the set scaling factor. For example, if the initial value of the acquisition period is 1.5 and the scaling factor is ⅓, the scaled acquisition period is 0.5.

In an embodiment, the speed level may be a speed level corresponding to different movement speeds.

In an embodiment, when the movement speed of the terminal is less than a first speed threshold, the speed level corresponding to the terminal is a low speed level; when the movement speed of the terminal is less than a second speed threshold and greater than the first speed threshold, the speed level corresponding to the terminal is a medium speed level; and when the movement speed of the terminal is greater than the second speed threshold, the speed level corresponding to the terminal is a high speed level. Here, the first speed threshold is less than the second speed threshold.

In an embodiment, the movement speed of the terminal may be an average speed of the terminal during the previous period before the current acquisition of the geographic location information.

In an embodiment, different speed levels may correspond to different scaling factors for scaling the initial value. In this way, the terminal, after acquiring the speed level, may acquire, according to the second period scaling configuration, the scaling factor corresponding to the speed level and scaling the initial value, and then acquire the acquisition period. For example, in the second period scaling configuration, the scaling factor is ½ when the speed level is a high speed level, and the initial value is 1, therefore when the speed level acquired by the terminal is the high speed level, the obtained acquisition period is 0.5.

In an embodiment, the configuration information includes:

a first period configuration including an initial value of the acquisition period; and a third period scaling configuration including a signal strength and a scaling factor, wherein the scaling factor corresponds to the signal strength and is configured to scale the initial value.

Here, the terminal, after receiving the configuration information, may perform the acquisition of the measurement information according to the initial value of the acquisition period configured by the configuration information.

In an embodiment, the signal strength may be the signal strength of a reference signal received by the terminal. Here, the signal strength is greater than a signal strength threshold when the terminal is in the central area of the cell, and is less than the signal strength threshold when the terminal is in the edge area of the cell.

In an embodiment, the acquisition period may be adjusted by scaling the initial value according to a set scaling factor. For example, if the initial value of the acquisition period is 1.5 and the scaling factor is ⅓, the scaled acquisition period is 0.5.

In an embodiment, different signal strengths correspond to different scaling factors for scaling the initial value.

In an embodiment, the signal strength may be either a reference signal received power (RSRP) or a reference signal received quality (RSRQ).

In an embodiment, the signal strength may be an average of the reference signals collected during a sampling time period.

In an embodiment, the terminal, after acquiring the signal strength, may determine a scaling factor corresponding to the signal strength according to the relationship, in the third period scaling configuration, between the signal strength and the scaling factor corresponding to the signal strength and scaling the initial value, and obtain the acquisition period according to the scaling factor. For example, in the third period scaling configuration, the corresponding scaling factor is ½ when the signal strength is a value of A, and the initial value is 1, then when the terminal receives a reference signal with a signal strength of A, the acquisition period acquired is 0.5.

Figure 13:
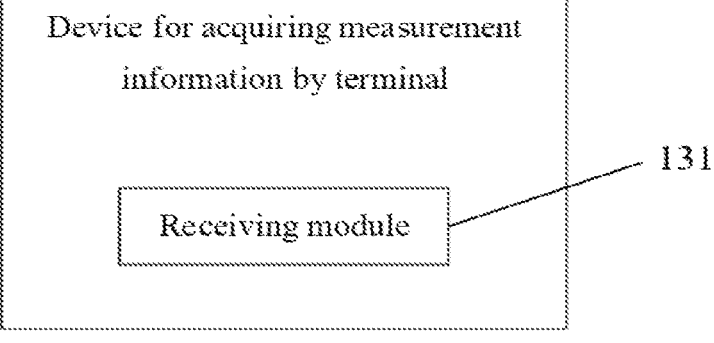
FIG. 13 is a schematic diagram of a device for acquiring measurement information by a terminal according to an embodiment.

As shown in FIG. 13, an embodiment provides a device for acquiring measurement information by a terminal, which is applied to the terminal. The device includes a receiving module 131.

The receiving module 131 is configured to receive configuration information for the terminal to acquire the measurement information, The configuration information is configured to determine, according to movement information of the terminal, an acquisition period of the measurement information.

Figure 14:
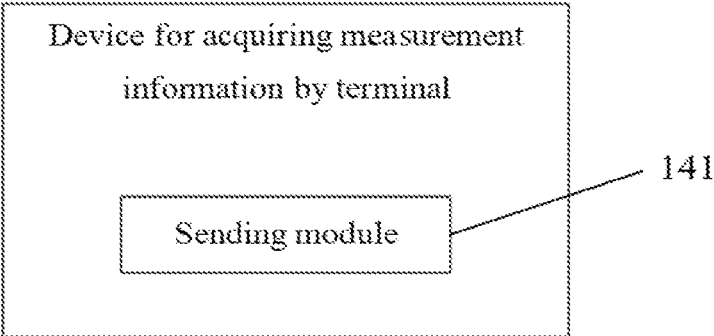
FIG. 14 is a schematic diagram of a device for acquiring measurement information by a terminal according to an embodiment.

As shown in FIG. 14, an embodiment provides a device for acquiring measurement information by a terminal, which is applied to a base station. The device includes a sending module 141.

The sending module 141 is configured to send configuration information for the terminal to acquire the measurement information, The configuration information is configured to determine, according to movement information of the terminal, an acquisition period of the measurement information.

With respect to the device in the above embodiment, the specific manner in which the individual modules perform their operations has been described in detail in the embodiments relating to the method and will not be described in detail here.

An embodiment of the present disclosure provides a communication device, including:

a processor; and a memory for storing instructions executable by the processor.

The processor is configured to implement the method applied in any embodiment of the present disclosure when running the executable instructions.

The processor may include various types of storage media that are non-transitory computer storage media that are capable of continuing to store information stored thereon after the communication device is powered down.

The processor may be connected to the memory via a bus, for example, for reading the executable program stored on the memory.

An embodiment of the present disclosure further provides a computer storage medium, wherein the computer storage medium stores a computer executable program, and the executable program implements the method according to any embodiment of the present disclosure when being executed by a processor.

With respect to the device of the above embodiment, the specific manner in which the individual modules perform their operations has been described in detail in the embodiments relating to the method, and will not be described in detail herein.

Figure 15:
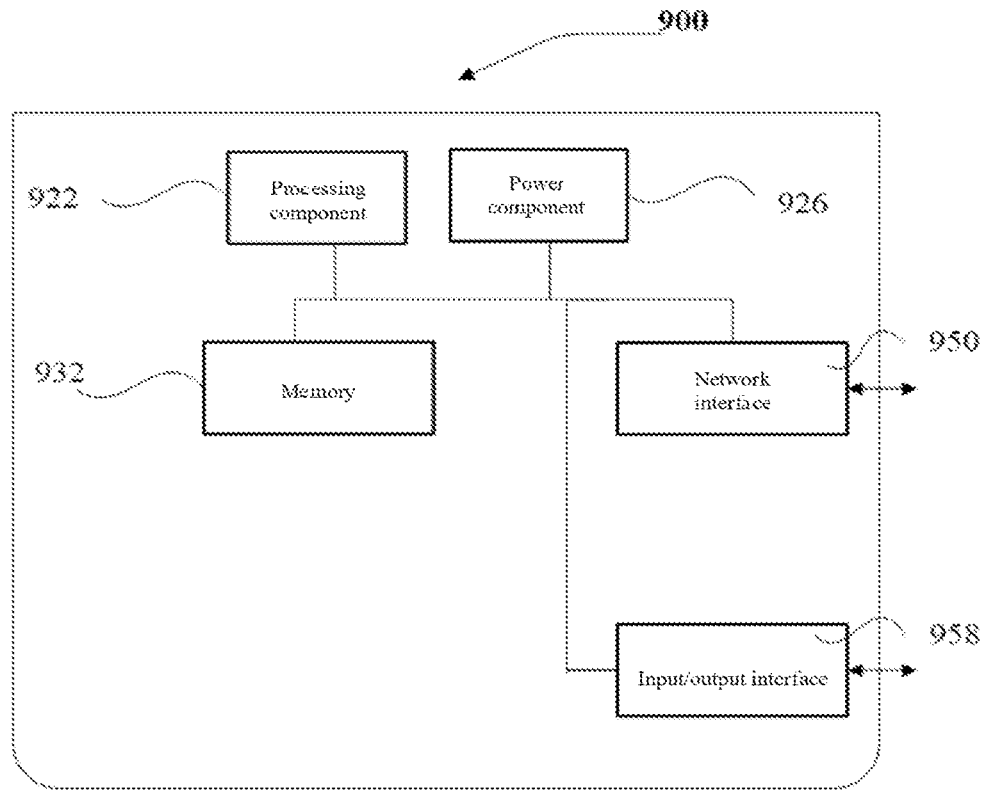
FIG. 15 is a block diagram of a base station according to an embodiment.

As shown in FIG. 15, an embodiment of the present disclosure illustrates a structure of a base station. For example, the base station 900 may be provided as a network side device. Referring to FIG. 15, the base station 900 includes a processing component 922 which further includes one or more processors, and a memory resource which is represented by a memory 932 and is configured for storing instructions such as application programs executable by the processing component 922. The application program stored in the memory 932 may include one or more modules each corresponding to a set of instructions. Furthermore, the processing component 922 is configured to execute instructions to perform the above method applied in the base station side.

The base station 900 may also include a power component 926 configured to perform power management of the base station 900, a wired or wireless network interface 950 configured to connect the base station 900 to a network, and an input/output (I/O) interface 958. The base station 900 may operate based on an operating system stored in memory 932, such as Windows Server™, Mac OS X™, Unix™, Linux™, Free BSD™ or the like.

A person skilled in the art may easily conceive of other embodiments of the present disclosure upon consideration of the specification and practice of the invention disclosed herein. The present disclosure is intended to cover any variations, uses, or adaptations of the present disclosure that follow the general principles of the present disclosure and include the common general knowledge or conventional technical means in the technical field not disclosed by the present disclosure. The specification and embodiments are to be regarded as exemplary only, with the true scope and spirit of the present disclosure being indicated by the following claims.

It is to be understood that the present disclosure is not limited to the precise structures described above and illustrated in the accompanying drawings, and that various modifications and changes may be made without departing from the scope thereof. The scope of the present disclosure is limited only by the appended claims.

What is claimed is:

1. A method for acquiring measurement information, comprising:

receiving, by a terminal and from a non-terrestrial network (NTN) base station, configuration information for the terminal to acquire the measurement information;

determining, by the terminal and according to movement information of the terminal and the configuration information, an acquisition period of the measurement information, wherein the configuration information comprises a mapping relationship between the movement information and the acquisition period.

2. The method according to claim 1, wherein the acquisition period comprises at least one of:

an acquisition period of geographic location information of the terminal; or an acquisition period for the terminal to acquire a channel measurement result.

3. The method according to claim 1, wherein the configuration information comprises:

a first period configuration comprising an initial value of the acquisition period; and a first period scaling configuration comprising a reference distance and a scaling factor, wherein the scaling factor corresponds to the reference distance and is configured to scale the initial value.

4. The method according to claim 3, wherein the movement information comprises a first distance, and the method further comprises:

determining, by the terminal, the first distance according to a magnitude relationship between an acquisition period in a previous acquisition of the measurement information and the initial value; and determining, by the terminal and according to the first distance and the first period scaling configuration, an acquisition period corresponding to the first distance.

5. The method according to claim 4, wherein determining, by the terminal, the first distance according to the magnitude relationship between the acquisition period in the previous acquisition of the measurement information and the initial value, comprises:

determining, by the terminal and in response to the acquisition period in the previous acquisition of the measurement information being the same as the initial value, that the first distance is a second distance, wherein the second distance is a distance of a current location of the terminal relative to a location of the terminal at the time of the previous acquisition of the measurement information, or a distance of the current location of the terminal relative to a location of a reference point in a cell in which the terminal is located; or determining, by the terminal and in response to the acquisition period in the previous acquisition of the measurement information being different from the initial value, that the first distance is a distance obtained by scaling the second distance according to a distance scaling parameter, wherein the distance scaling parameter is a ratio of the acquisition period of the terminal at the time of the previous acquisition of the measurement information to the initial value.

6. The method according to claim 1, wherein the configuration information comprises:

a first period configuration comprising an initial value of the acquisition period; and a second period scaling configuration comprising a speed level and a scaling factor, wherein the scaling factor corresponds to the speed level and is configured to scale the initial value.

7. The method according to claim 6, wherein the movement information comprises a movement speed of the terminal, and the method further comprises:

determining, by the terminal and according to a level corresponding to the movement speed of the terminal and the second period scaling configuration, an acquisition period corresponding to the movement speed of the terminal.

8. The method according to claim 7, wherein the method further comprises:

determining, by the terminal, the movement speed of the terminal according to a second distance and an acquisition period corresponding to a previous acquisition of the measurement information, wherein the second distance is a distance of a current location of the terminal relative to a location of the terminal at the time of the previous acquisition of the measurement information.

9. The method according to claim 7, wherein the configuration information further comprises a movement speed configuration, and the method further comprises:

determining, by the terminal and according to the movement speed and the movement speed configuration, the level corresponding to the movement speed of the terminal, wherein the movement speed configuration comprises the movement speed and the level corresponding to the movement speed.

10. The method according to claim 1, wherein the configuration information comprises:

a first period configuration comprising an initial value of the acquisition period; and a third period scaling configuration comprising a signal strength and a scaling factor, wherein the scaling factor corresponds to the signal strength and is configured to scale the initial value.

11. The method according to claim 10, wherein the movement information comprises a signal strength of a reference signal received when the terminal moves, and the method further comprises:

determining, by the terminal and according to the signal strength of the reference signal received and the third period scaling configuration, an acquisition period corresponding to the signal strength received.

12. The method according to claim 1, wherein the configuration information comprises:

configuration information sent by the NTN base station via a broadcast message; and/or configuration information sent by the NTN base station via a radio resource control (RRC) message.

13. The method according to claim 12, wherein the method further comprises:

after receiving the configuration information sent by the NTN base station via the RRC message, ignoring, by the terminal, the configuration information sent by the NTN base station via the broadcast message.

14. A method for acquiring measurement information, comprising:

sending, by a NTN base station and to a terminal, configuration information for the terminal to acquire the measurement information, wherein the configuration information is configured for the terminal to determine, according to movement information of the terminal, an acquisition period of the measurement information, and the configuration information comprises a mapping relationship between the movement information and the acquisition period.

15. The method according to claim 14, wherein acquisition period comprises at least one of:

an acquisition period of geographic location information of the terminal; or an acquisition period for the terminal to acquire a channel measurement result.

16. The method according to claim 14, wherein the configuration information comprises:

a first period configuration comprising an initial value of the acquisition period; and a first period scaling configuration comprising a reference distance and a scaling factor, wherein the scaling factor corresponds to the reference distance and is configured to scale the initial value.

17. The method according to claim 14, wherein the configuration information comprises:

a first period configuration comprising an initial value of the acquisition period; and a second period scaling configuration comprising a speed level and a scaling factor, wherein the scaling factor corresponds to the speed level and is configured to scale the initial value.

18. The method according to claim 14, wherein the configuration information comprises:

a first period configuration comprising an initial value of the acquisition period; and a third period scaling configuration comprising a signal strength and a scaling factor, wherein the scaling factor corresponds to the signal strength and is configured to scale the initial value.

19. The method according to claim 14, wherein the configuration information comprises:

broadcasting, by the NTN base station, the configuration information; and/or sending, by the NTN base station, a radio resource control (RRC) message carrying the configuration information.

20. A device for acquiring measurement information, applied to a terminal, comprising:

a processor; and a memory having executable instructions stored thereon that, when be executed by the processor, cause the processor to execute actions of:

receiving, from an NTN base station, configuration information for the terminal to acquire the measurement information, determining, according to movement information of the terminal and the configuration information, an acquisition period of the measurement information, wherein the configuration information comprises a mapping relationship between the movement information and the acquisition period.

* * * * *